(12) United States Patent
Herrick et al.

(10) Patent No.: US 10,533,632 B1
(45) Date of Patent: Jan. 14, 2020

(54) HINGE PIVOT CABLE GRIPPER

(71) Applicant: RODDIE, INC., Columbia Falls, MT (US)

(72) Inventors: Rod Herrick, Whitefish, MT (US); Jared W Shappell, Kalispell, MT (US)

(73) Assignee: RODDIE, INC., Columbia Falls, MT (US)

( * ) Notice: Subject to any disclaimer, the term of this patent is extended or adjusted under 35 U.S.C. 154(b) by 0 days.

(21) Appl. No.: 16/101,401

(22) Filed: Aug. 11, 2018

Related U.S. Application Data

(63) Continuation-in-part of application No. 15/880,538, filed on Jan. 26, 2018, now Pat. No. 10,247,277.

(60) Provisional application No. 62/451,502, filed on Jan. 27, 2017.

(51) Int. Cl.
  *F16G 11/04* (2006.01)
  *B25J 15/00* (2006.01)

(52) U.S. Cl.
  CPC .................. *F16G 11/048* (2013.01)

(58) Field of Classification Search
  CPC ..................................... F16G 11/048
  USPC ...................... 294/132, 103.1, 106
  See application file for complete search history.

(56) References Cited

U.S. PATENT DOCUMENTS

| | | | | |
|---|---|---|---|---|
| 1,776,133 A * | 9/1930 | Prindle | ............. | H01J 1/18 174/138 R |
| 3,134,844 A * | 5/1964 | Myers | ............. | H01R 4/186 174/71 R |
| 4,097,169 A * | 6/1978 | Kelly | ............. | F16B 2/10 135/119 |
| 4,657,284 A * | 4/1987 | Fiori | ............. | F16L 23/10 24/20 S |
| 4,719,671 A * | 1/1988 | Ito | ............. | F16G 11/14 24/115 M |
| 4,955,750 A * | 9/1990 | Goran | ............. | E06C 1/56 24/115 R |
| 5,015,023 A | 5/1991 | Hall | | |
| 5,163,643 A * | 11/1992 | Auclair | ............. | H02G 7/08 248/61 |
| 5,622,341 A * | 4/1997 | Stana | ............. | F16L 3/13 248/221.11 |
| 6,076,236 A * | 6/2000 | DeFrance | ............. | F16G 11/048 24/132 WL |
| 6,595,472 B1 * | 7/2003 | Pisczak | ............. | G02B 6/483 248/74.1 |

(Continued)

OTHER PUBLICATIONS

Marketing Material [online; retrieved Sep. 11, 2018] Company Name:Chant Engineering Co. Inc. Product: Wire Rope Grips Company website: https://chantengineering.com/products/wire-rope-grips/.

(Continued)

*Primary Examiner* — Paul T Chin
(74) *Attorney, Agent, or Firm* — Robin Kelson Consulting, Inc.

(57) ABSTRACT

A timed, mechanical grip and release wire rope gripper device and system utilizing a pivot mechanism to transfer cable pulling load to the gripper members for opening and closing an axial cable channel or bore defined by the gripper members. The pivot mechanism can act as a hinge for lateral movement of the gripper members or as a pivot point for rotating the gripper members. The mechanism supports substantially even pressure along the cable gripping surface during operation without seizing or excessive cable biting.

20 Claims, 14 Drawing Sheets

(56) References Cited

U.S. PATENT DOCUMENTS

| | | | | |
|---|---|---|---|---|
| 8,500,073 | B2* | 8/2013 | Quesnel | H02G 7/053 |
| | | | | 24/285 |
| 9,453,555 | B2* | 9/2016 | Dingley | F16G 11/048 |
| 9,948,080 | B2* | 4/2018 | Bentley | H02G 7/125 |
| 10,103,525 | B2* | 10/2018 | Baptiste | H02G 1/06 |
| 2016/0348807 | A1 | 12/2016 | Herrick et al. | |

OTHER PUBLICATIONS

Marketing Material [online; retrieved Sep. 11, 2018] Company Name:. Forum Energy Technologies Product: TA17 Cable Gripper; https://www.f-e-t.com/images/uploads/A001-350-003_iss_8(1).pdf Company website: https://www.f-e-t.com.

Marketing Material [online; retrieved Sep. 11, 2018] Company Name:. POW-R Mole Products: Pipe Bursting Equipment (see, e.g., PD-33; http://www.powrmole.com/bursting-and-boring; https://irp-cdn.multiscreensite.com/3c87f020/files/uploaded/PD-33%20-%20Lateral%20Pipe%20Bursting%20Machine.pdf).

Instructional Video [online; retrieved Sep. 11, 2018] Company Name:. TRIC Tools Video URL: https://www.youtube.com/watch?v=9HaMI5QI50M Company website: https://www.trictools.com.

Marketing Material [online; retrieved Sep. 11, 2018] Company Name:. Hammerhead Trenchless Product: Portaburst Lateral Bursting Systems; https://www.hammerheadtrenchless.com/products/pipe-bursting/lateral-bursting Company website: https://www.hammerheadtrenchless.com.

Marketing Material [online; retrieved Jul. 8, 2019] Company Name:. TT Technologies Product: https://www.tttechnologies.com/download/literature/grundotugger-lit.pdf Company website: https://www.tttechnologies.com.

Marketing Material [online; retrieved Jul. 8, 2019] Company Name:. TT Technologies Product: https://www.tttechnologies.com/products/grundotugger-lateral-pipe-bursting-system/ Company website: https://www.tttechnologies.com.

* cited by examiner

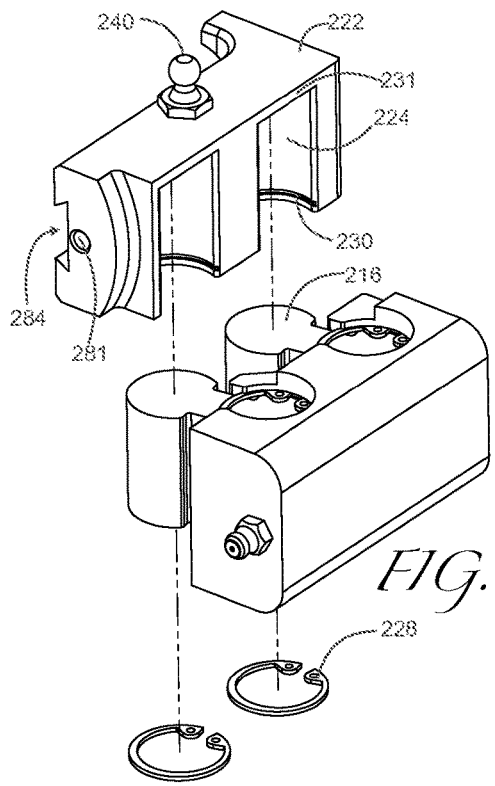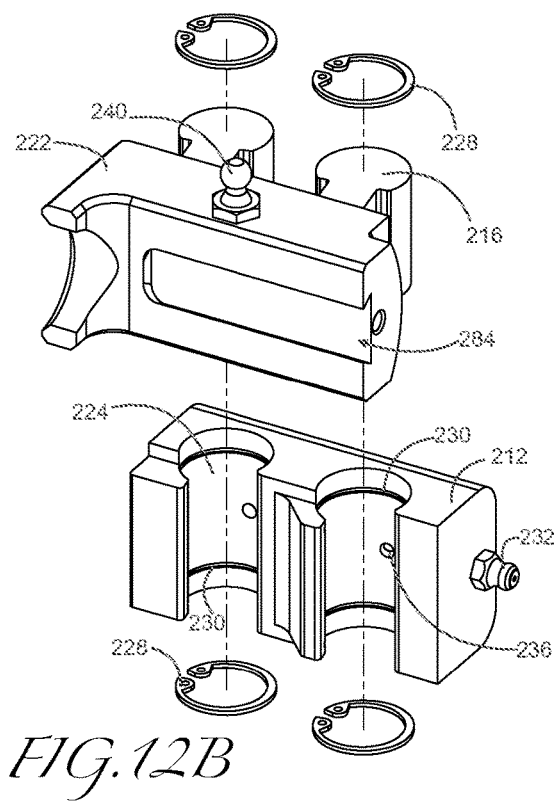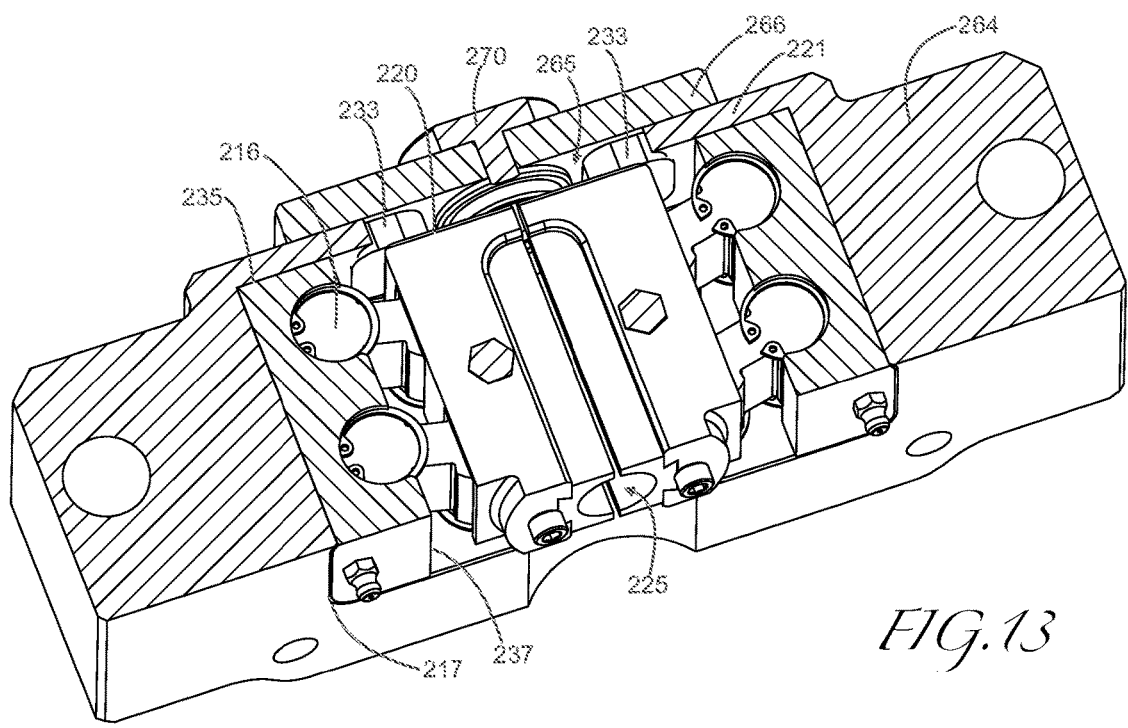

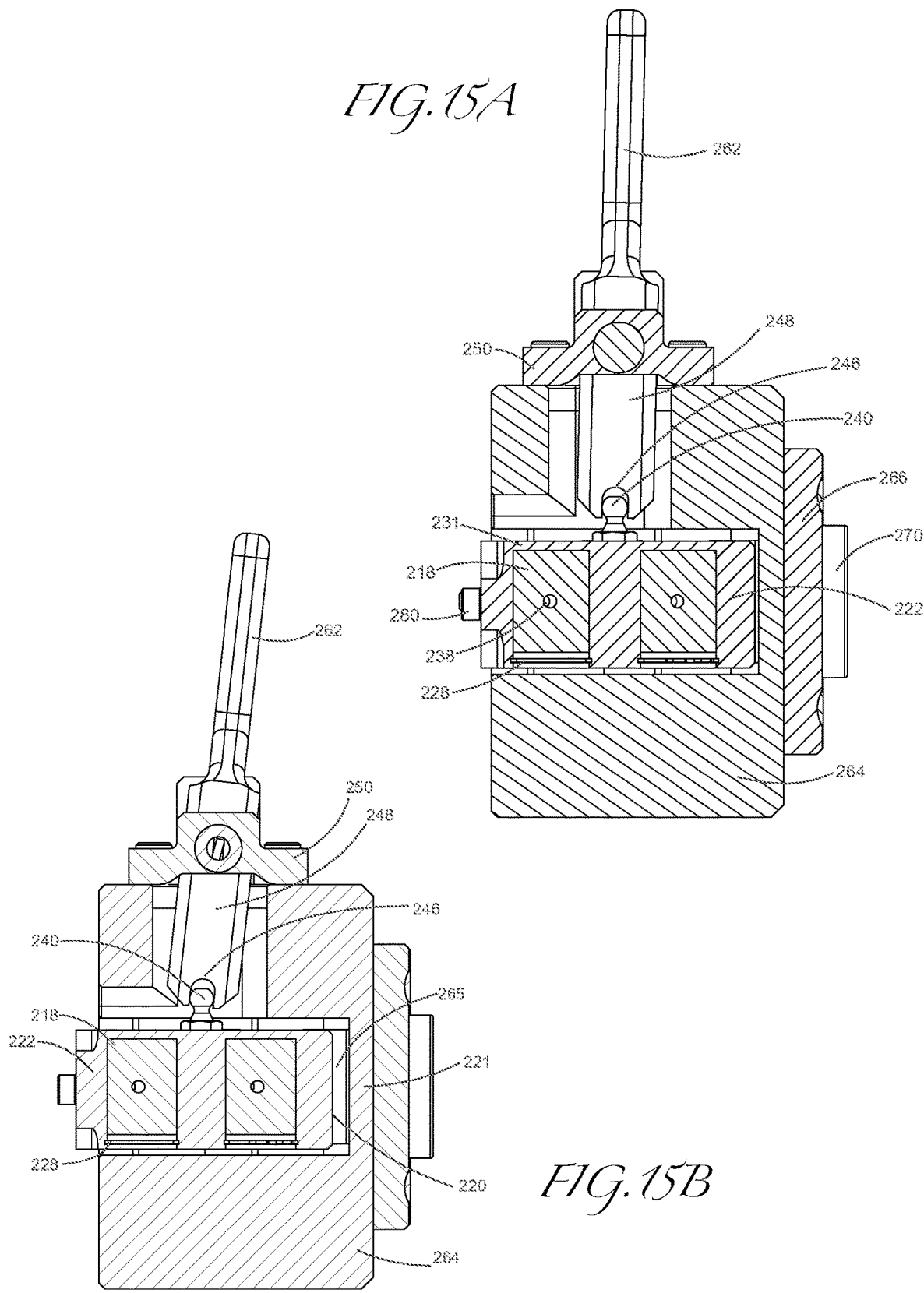

HINGE PIVOT CABLE GRIPPER

CROSS REFERENCE TO RELATED APPLICATIONS

This application is a continuation-in-part of U.S. patent application Ser. No. 15/880,538, filed Jan. 26, 2018, which claims the benefit of provisional U.S. patent application Ser. No. 62/451,502, filed Jan. 27, 2017, the disclosures of which are hereby expressly incorporated in their entirety by reference herein.

FIELD OF USE

Embodiments of the present disclosure find applicability in the field of cable or wire rope clamping and gripping mechanisms. One useful field includes the field of horizontal directional drilling. Another field is the field of drilling, including vertical drilling. Still other fields include any field where cable clamping or winching is required as part of moving cable through space, including for example, chair lift, gondola and cable car applications, ship anchor placement applications, and dredging applications, to name a few.

BACKGROUND

It is common practice in fields and industries that require pulling metal cable or metal rope through space to use a cable gripping mechanism that includes the ability to grip and release the cable on demand, so the cable can be pulled through space. Oftentimes, the pulling apparatuses utilize a pair of gripping mechanisms, one gripping while the other is released so the cable can effectively be pulled "hand over hand." In these circumstances the gripping mechanisms work in tandem to create a winching mechanism or system for intermittent and continuous heavy pulling, lifting and lowering.

Ideally, the grip and release mechanism is designed to prevent the cable slipping backwards, particularly during a cable pulling recovery stroke. This is also known as a "non-slip" system. The mechanisms typically include a gripper having an inner surface that defines an aperture or axial channel or bore dimensioned to receive the cable or wire rope, and lined with "teeth" that bite the cable and hold it in position as the gripper is forced down on to the cable surface. These "teeth" typically are created by means of serrations or threaded ridges on the cable engaging surfaces of the axial channel.

Many gripper mechanisms typically in use in the art work on a nested wedge principle that provides a structural means for translating the force applied in cable pulling to the cable grippers themselves. Here the cable or wire rope is sandwiched between member segments that together define a wedge set. Generally, the wedge set has an overall triangular shape, typically defined by two gripper members, or it can have an overall frusto-conical shape defined by a plurality of gripper members, typically two-four members. The wedge set is nested in, or fits within, a cavity or recess that comprises part of the cable pulling apparatus and is dimensioned to receive the wedge gripper set. As the wire rope is pulled, the wedge set is forced into the cavity or recess, the wedge set outer edges sliding along the tapered inner surface of the cavity or recess such that the wedge pieces are forced down onto the cable or wire rope surface, squeezing the cable or wire rope, and biting the rope with gripper "teeth".

Cable pulling force typically is provided hydraulically, moving the cable pulling apparatus component that houses the gripper wedge recess during the pulling stroke. As the recess housing is pulled forward, the gripper wedge set is forced into the recess and onto the cable surface, gripping the cable and pulling it forward with the housing. Thus the nested wedge system provides a structural means for translating the cable pulling force provided by the hydraulics to the cable grippers themselves for gripping the cable.

To be functional, a cable gripping mechanism also preferably includes some means for supporting the gripper members in moving in unison on and off a cable surface so as to provide substantially even pressure on the cable, as well as some means for limiting the distance the gripper members can move off the cable. Gripper member linking means in use in the art can include a mechanical link such as a yoke that connects the members together. Other linking means can include magnetic means positioned between the cable gripping members. Still other means used in the art can include a direct, timed connection between the individual cable grippers and the cable pulling apparatus itself. Such connections can include mechanical or hydraulic connections.

Gripper member limiting means in use in the art typically include mechanical range-able or extensible limiters. Examples include elastomers linking gripper members or a gripper yoke to the pulling apparatus; compression springs; telescoping means, including pistons, and the like. U.S. Pat. Nos. 5,015,023; 6,305,880; and 2016-0348807; Chant Engineering's "Wire Rope Grips", https://chantengineering.com/products/wire-rope-grips/; and Pow-r Mole Sales LLC cylinder-activated jaws, http://www.powrmole.com/bursting-and-boring, are representative of the art.

In part because of the great force placed on the cable as it is being pulled (typically, cable pulling machines can have a pulling force of anywhere from about 6 tons to 100+ tons) the cable can have a tendency to twist as it is pulled, making it difficult for cable gripping mechanisms in the art to maintain an even grip or even pressure on the cable. Thus cable gripping mechanisms or systems in the art, including nested wedge gripper systems that rely on a structural force translation means to move the grippers into position on a cable, can be subject to great wear and tear, and can have a tendency to seize, and/or require the need for anti-seize lubricants to allow them to function properly in the field. Another impact of the great force nested wedge gripper systems in the art can apply to cable or wire rope surfaces is that they can "bite" the cable so strongly they can cut the individual wire strands, fraying the rope or cable on its lateral surface, and thereby weakening the cable.

Existing gripper systems often are multi-piece systems that can be complicated or cumbersome to install, especially in a vertical pulling system. One drawback of existing gripper mechanisms is the number and complexity of components to the mechanism that can break in the field, in part due to the high pressure exerted on them, and the difficulty in keeping tension even on the cable from multiple gripper members. The multiplicity of independent components also can make the gripper mechanisms difficult or cumbersome to install, remove or repair, especially in the field. Sliding wedge components can have a tendency to seize and so can require use of anti-seizing compounds applied to them and/or the cable surface, making the grippers difficult to clean. In addition, these systems typically are open systems, and debris can get caught between the gripper members and the tapered or sliding surface, making seizing more likely and/or otherwise impeding proper movement of the members and even pressure on the wire surface. Cleaning the debris out in the field can be cumbersome at best, and often difficult. Keeping the system in good working condition in open systems typically requires taking the components apart and carefully cleaning out debris and excess grease or lubricant, also a tedious and cumbersome activity.

In large wire rope nested wedge gripping systems, proper cleaning can be especially difficult. Moreover, where the timing and/or gripper limiting means is provided by a separate hydraulic system, this additional system with its own maintenance and power needs, also needs to be maintained and managed in the field.

In addition, some gripping mechanisms work only in a vertical or horizontal system, but not both. This can be a drawback in designing pulling or winching systems for multiple applications where it can be advantageous to utilize a range of pulling positions for different operations. It would be advantageous to have a "universal" gripper system that can work in either a vertical or horizontal position without modification. It also would be advantageous for the gripper system to be able to occupy both the "front" holding position and "rear" pulling position without modification, for use in tandem cable gripper systems where the grippers form part of a "hand over hand" cable winching system with front and back cable grippers that alternately grip the cable to pull the cable during the pulling stroke and hold the cable from slipping backward during the recovery stroke.

There remains a need for a grip and release wire rope or cable gripper system that provides substantially even pressure along a cable gripping surface during operation, that is not subject to seizing, and that minimizes cable fraying. There also remains a need for a gripper system that does not rely on a nested wedge system or other structural means for translating force to the cable grippers; that can be applied in both horizontal and vertical systems, and that can be used in both a cable pulling and cable holding position without modification. There also remains a need for a gripper system that does not require a tapered sliding surface to support engaging and gripping a wire rope surface, that does not "bite" a cable side surface excessively, and that is not subject to seizing, even under high pulling forces. Finally, there remains a need for a gripper system that can be installed as a unit; that is easy to use and maintain; that has few moving parts; that is less subject to wear and tear; that is small and compact; that can be fabricated as a "closed system" such that the force translation means is not impacted by debris in the field; and that does not require application of anti-seizing lubricant to the gripper or cable surfaces.

The present disclosure describes improvements in metal cable or rope gripping mechanisms and methods of use thereof that overcome deficiencies in the mechanisms and devices of the prior art.

SUMMARY

This summary is provided to introduce a selection of concepts in a simplified form that are further described below in the Detailed Description. This summary is not intended to identify key features of the claimed subject matter on its own, nor is it intended to be used on its own as an aid in determining the scope of the claimed subject matter.

In accordance with one embodiment of the disclosure provided herein is a novel cable or wire rope gripping and release device or mechanism, and method of use. The device has several advantages over devices and mechanisms in the art, including being an integrated system that can be installed as a single element, being compact, and using a simple, timed mechanical pivoting means for gripping a cable surface. The simplified gripping and release means provided by the devices of the instant disclosure can be used in vertical and horizontal cable pulling apparatuses, and does not have to be modified when used in tandem for winching or pulling applications that require both a cable pulling and a recovery cable-holding stroke.

In one embodiment, the gripper mechanism comprises a system comprising two opposing gripper members, each member having a concave inner cable gripping surface, the two concave inner surfaces together defining an axial opening, bore or channel for receiving a cable. In another embodiment, the two opposing gripper members are substantial mirror images of one another.

In another embodiment, the integrated gripper device or mechanism of the instant disclosure comprises mechanical means for transferring the cable pulling load or force to the cable gripper members for closing and opening the gripper members about a cable surface. In one preferred embodiment, the mechanical load transfer means can comprise a pivot mechanism. In one embodiment each cable gripper member is competent to rotate about the pivot mechanism, thereby opening and closing the axial channel to release and hold a cable, respectively. In another embodiment, the pivot mechanism comprises a hinge linking each cable gripper member to the cable pulling apparatus, such that the cable gripper members move substantially laterally and parallel to one another as the hinge opens and closes the axial cable channel or bore.

In another embodiment, the integrated gripper device or mechanism of the instant disclosure comprises mechanical timing means for timing the closing and opening of the gripper members about a cable surface such that each gripping member applies substantially the same pressure to the cable or wire rope surface at substantially the same time. In one embodiment, the mechanical timing means can be carried out by means of a gearing mechanism. In another embodiment, the timing means can include a mechanical means for linking the two gripper members.

In one embodiment, each gripping member can include a gear segment for linking the members such that, as the gears are moved, the gear teeth engage and bring the gripper members, and the concave cable gripping surfaces, together. In one preferred embodiment the gear ratio can be 1:1.

In another embodiment, the mechanical linking means can comprise means for allowing timed lateral and axial movement of the cable grippers such that the concave inner cable gripping surfaces of the members remain substantially parallel to one another as the grippers are moved on or off a cable.

In still another embodiment, mechanical gripper member limiting means are provided. In one embodiment, the gripper limiting means can comprise an extensible, range-able or telescoping means. In one embodiment the extensible means can include an elastomer. In still another embodiment, the limiter means can comprise a mechanical stop.

In still another embodiment, mechanical means can be provided for engaging gear segments in a pivoting gripper member device system. In one embodiment, the engagement means can include means for providing sufficient tension between two gripper members to keep the gear segment teeth linking the members at least partially engaged in an installed system. In one currently preferred embodiment, the tensioning means can be provided by means of an elastomer.

In still another embodiment, the cable gripping mechanism can be engaged by means of a mechanical pivot, hinge, swing, or moveable joint competent to transfer force to the cable grippers and open or close the cable axial channel thereby. In one embodiment, the mechanical pivot can comprise a shaft detachably engaged with at least one gripper member, such that rotation of the shaft about an axis rotates the gripper member laterally, thereby opening or closing the mechanism off or on the cable surface, depending on the direction the pivot shaft is rotated. In another embodiment, the pivot shaft can be perpendicular to the plane of the gripper member and provide a single pivot point for rotating the gripper member about the shaft axis.

In still another embodiment, the pivot gripper system or device also can comprise means for locking gripper members in a preferred position, typically in an open position, for ease of inserting or removing a cable from the device. In one embodiment, the locking means can comprise part of the mechanical linking means connecting the two gripper members. In another embodiment, the locking mechanism can comprise part of the pivoting mechanism.

In another embodiment a device, mechanism and method of use are provided for engaging and releasing a cable in a cable pulling apparatus. The mechanism and device can include a pair of planar, opposing cable engaging members. Each member has an inner, cable gripping or cable engaging surface or face and an opposing outer, hinge-engaging surface or face. The cable engaging faces of the opposing cable engaging members can comprise concave surfaces that together define an axial channel or bore for receiving a cable. It will be appreciated that the bore's longitudinal axis is parallel to the cable gripping member's longitudinal axis. Preferably, the concave inner cable engaging surface is textured to enhance a cable "biting" or gripping surface.

In another embodiment, the device, mechanism and method of use also can include planar, pivoting hinge means that extend out from the outer cable engaging member face and link the cable gripper or cable engaging member to a fixable surface. In one embodiment the fixable surface can include a pivot base component that can be held stationary by mechanical or structural constraint. In another embodiment the pivoting hinge means can include a shank having a pivot head at each terminal end, one pivot head engaging with cable gripper member outer surface, and the other head engaging with the fixable surface. In this embodiment the shank can act as a link connecting the gripper member with the fixable surface. In another embodiment, the pivot head can comprise a substantially cylindrical shape and can engage with the gripper member and fixable surface by means of a socket dimensioned to receive the cylinder and allow it to rotate therewith. It will be appreciated that this pivoting hinge mechanism allows the linked fixable surface and gripper member to move longitudinally and laterally about each other, the degree of movement dictated at least in part by the length of the linkage shank. It also will be appreciated that when the fixable surface is held stationary, only the gripper member moves. When both members of the cable engaging pair are linked to their opposing fixable surfaces, the lateral movement of the opposing gripper members opens and closes the axial bore.

In another embodiment, means are provided herein for mechanically tethering the two cable engaging members such that their pivoting hinge movement is timed to occur substantially concurrently. In still another embodiment, the tethering means can include a pivoting joining means for coupling the tether to the cable engaging members. In another embodiment, the pivoting joining means comprises a ball and socket joint. In still another embodiment, the mechanical tether comprises a lever, a fulcrum and two sockets for engaging with a ball stud on each cable engaging member to form ball and socket joint. In yet another embodiment, the fulcrum includes a torsional spring means and the tether is spring-loaded. In still another embodiment, the torsional force in the spring-loaded tether is competent to urge longitudinal movement of the cable engaging members through the ball and socket joint.

In another embodiment, the device, mechanism and methods of use include means for locking the gripper members in an open axial bore position. In one embodiment the locking means include mechanical locking means.

In still another embodiment, the device and mechanism include a housing or casing having an inner cavity dimensioned to receive the device or mechanism. In one embodiment the cavity inner walls hold the fixable surface so that it remains stationary relative to the cable engaging member. In one embodiment the casing comprises part of a holding gripper manifold. In another embodiment the casing comprises part of a pulling gripper bridge. In still another embodiment the device comprises part of a horizontal cable pulling apparatus. In another embodiment the device comprise part of a vertical cable pulling apparatus.

In yet another embodiment the device and mechanism comprise a means for limiting the longitudinal movement of the pivot hinge. In one embodiment the means can limit the rotation of the pivot shank.

DESCRIPTION OF THE DRAWINGS

The foregoing aspects and many of the attendant advantages of this disclosure will become more readily appreciated as the same become better understood by reference to the following detailed description when taken in conjunction with the accompanying drawings, where like-numbered parts reference like-membered components and wherein:

FIGS. 12A and 12B are exploded views of hinge pivot components according one embodiment of the present disclosure;

FIG. 13 is a cut-away view of a hinge pivot gripper system and casing according one embodiment of the present disclosure;

FIGS. 15A and 15B are side cut-away views of the hinge pivot gripper system and casing of FIG. 14A;

DETAILED DESCRIPTION

Embodiments of the present disclosure provide devices, systems, components, mechanisms and methods of use directed to improved means for gripping a cable or wire rope surface, particularly a cable or wire rope to be pulled through space.

The subject matter defined in the appended claims is not necessarily limited to the benefits described herein. A particular implementation of the advancements to the art disclosed herein may provide all, some or none of the benefits described herein. Although operations for the various techniques may be described herein in a particular sequential order for the sake of presentation, it will be understood that this manner of description encompasses rearrangements in the order of operations, unless a particular ordering is required. For example, operations or acts described sequentially may in some cases be rearranged or performed concurrently.

For the purposes of the instant disclosure a mechanism is understood to include a mechanical portion of a machine or device that is responsible for transferring motion, force, and/or torque from an input source to an output source. Where mechanisms comprise linkages and joints, links are considered rigid parts and joints are moveable connections between the links and allow relative motion between the links. Also for the purposes of the instant disclosure, when referring to a horizontal cable pulling apparatus, the pulling gripper mechanism is understood to be located at the rear of the machine, and the holding gripper mechanism is understood to be located at the front of the machine. Similarly, when referring to a vertical apparatus, the pulling gripper mechanism is understood to be located at the top of the system, and the holding gripper mechanism is understood to be located at the bottom of the system.

I. Pivoting Gripper Member System

Figure 1:
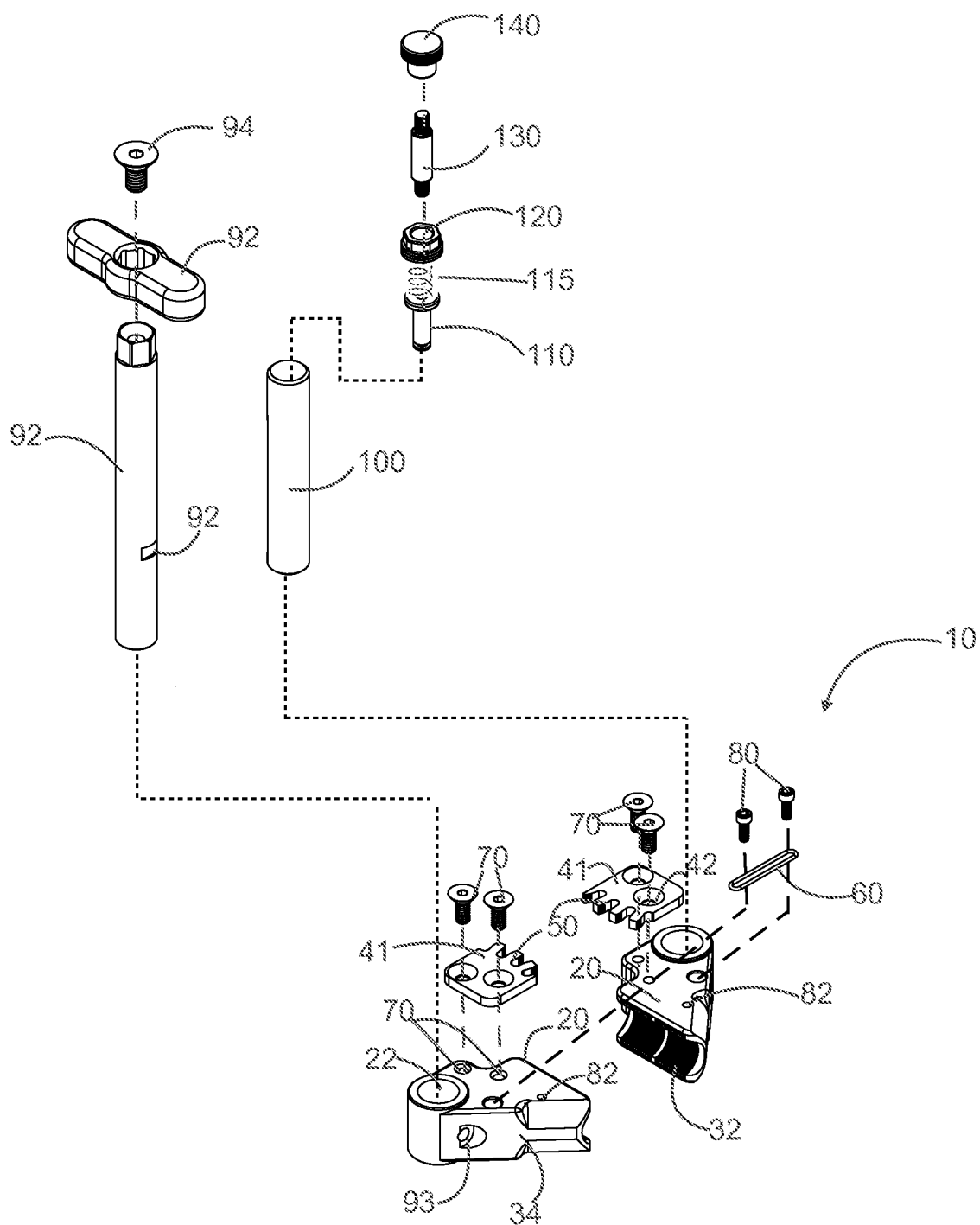
FIG. 1 is an exploded view of a timed pivot gripper system according to one embodiment of the present disclosure.
Figure 2:
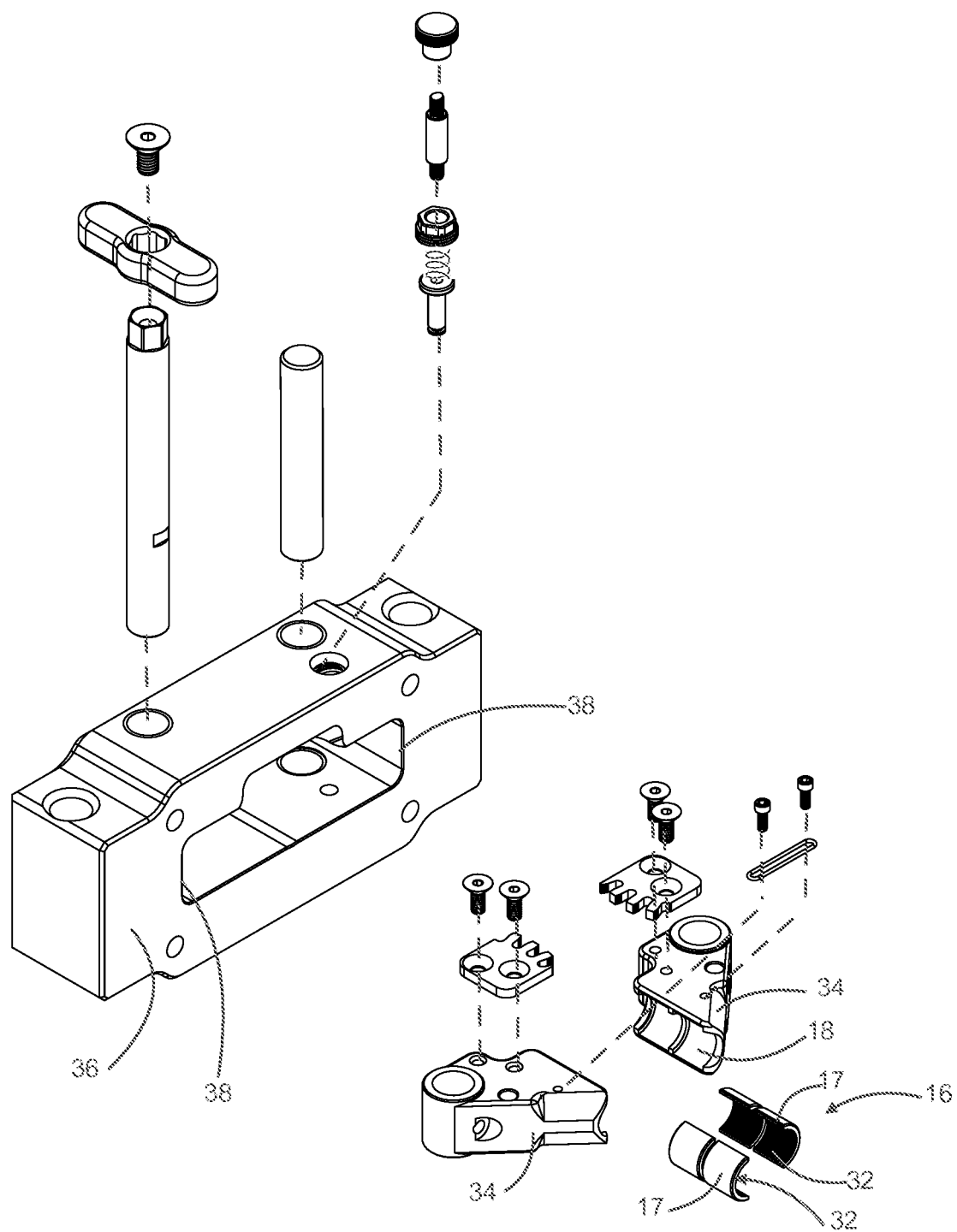
FIG. 2 is an exploded view of a timed pivot gripper system, according to another embodiment of the present disclosure.
Figure 3:
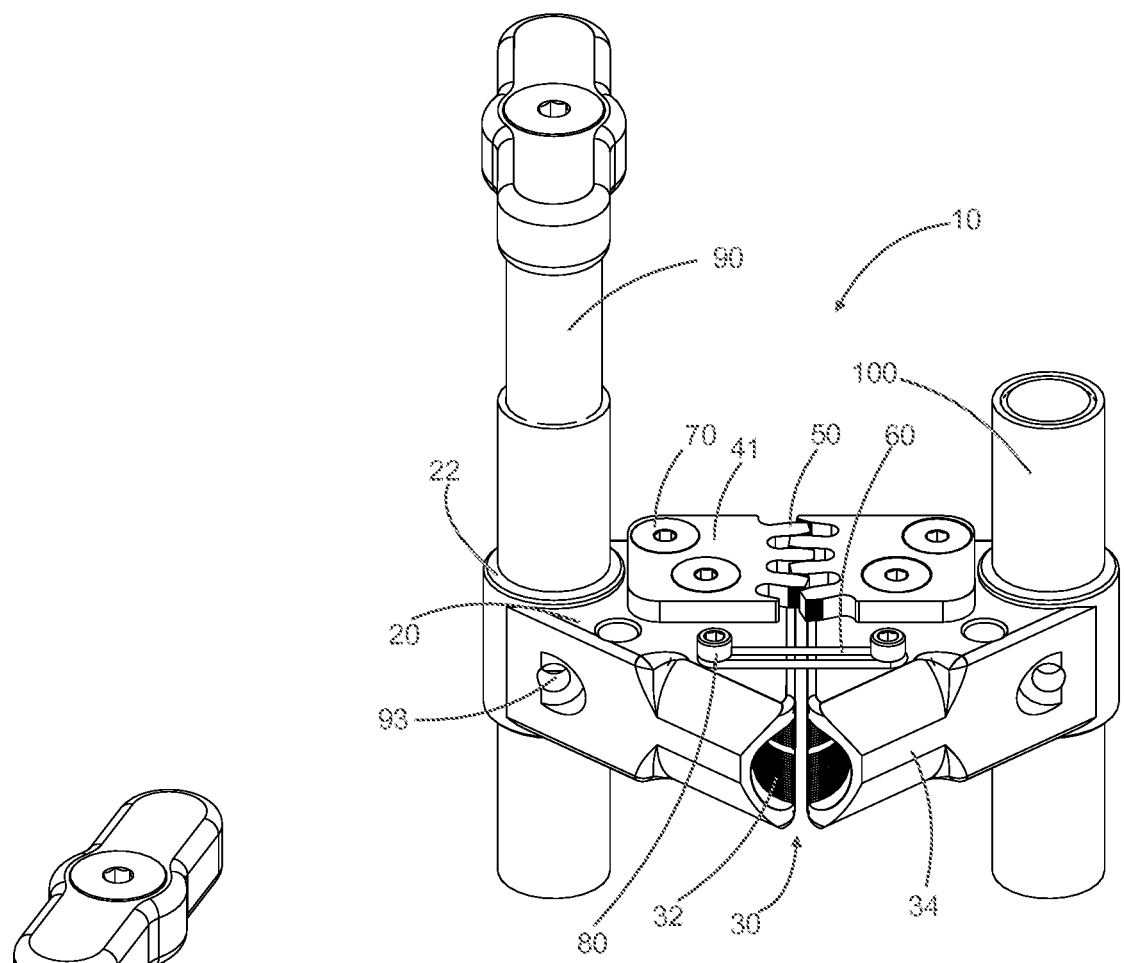
FIG. 3 is a perspective view of a timed pivot gripper system according to one embodiment of the present disclosure in a closed position.

Referring to FIGS. 1-7, and in particular to FIGS. 1, 2 and 3, two embodiments of a useful timed pivot cable gripping mechanism and device in accordance with the present disclosure are shown. In particular, a cable gripper system is illustrated wherein the cable grippers can rotate about a pivot point, the pivot point providing the mechanical load transfer means from the cable pulling device to the cable gripper pieces.

In the figures, embodiments of a gripper mechanism 10 are illustrated in an exploded view. Gripper mechanism 10 comprises a plurality of gripper member wedge pieces 20. Typically the gripper mechanism comprises a pair of opposing gripper members or wedge pieces that are mirror images of one another, and other numbers of wedge pieces are envisioned to be useful. Wedge shaped gripper members 20 each comprise an inner, concave surface 32 shaped and dimensioned to fit on the surface of a metal cable or wire rope such that, when mirror image gripper members come together, concave surfaces 32 together define an axial aperture, bore or channel 30 dimensioned to receive a cable or wire rope. In a preferred embodiment, concave surfaces 32 are ribbed or cut or otherwise textured to enhance the ability of concave surface 32 to "bite" into and hold to the metal surface when wedge 20 is pressed down onto the wire rope or metal cable.

The gripping devices of the present disclosure have a mechanical means for timing the opening and closing of concave surfaces 32 onto a cable surface such that surfaces 32 grip and hold the cable with substantially the same force. In the non-limiting examples illustrated in FIGS. 1-7, the timing mechanism of the present disclosure is illustrated by mirror image gear segments 41 attached to a surface of opposing mirror image wedge pieces 20, positioned such that, when a gripper member 20 is pivoted about a hinge point 22, gear teeth 50 on the two segments 41 engage with each other. Because gear segments 41 are substantial mirror images on gripper members 20, the gear ratio between segments 41 is 1:1. Thus, as one gripper member is pivoted about hinge point 22, engaged gear segments 41 translate the force of the pivot motion into substantially equal pressure applied to the wire rope or cable surface from both inner gripping surfaces 32. It will be appreciated by those of ordinary skill in the art that the number of gear teeth 50 on each gear segment 41 can be any desired number, and the size and shape of gear segments 41 can be varied as desired depending on the size of wedge pieces 20, the diameter of cable to be gripped and the amount of gripping and/or pulling force to be applied to the cable surface. Similarly, the choice of metal composition for gear segments 41 and gear teeth 50 can be made taking into account these standard variables.

Gear segment 41 can be integrally or removably attached to a surface of wedge piece 20 by any standard means. In the figures, bolts 70 pass through apertures 42 on the segment and bolt into apertures 72 on wedge piece 20. Other means of attachment are contemplated and are within the skill in the art to apply.

Figure 4:
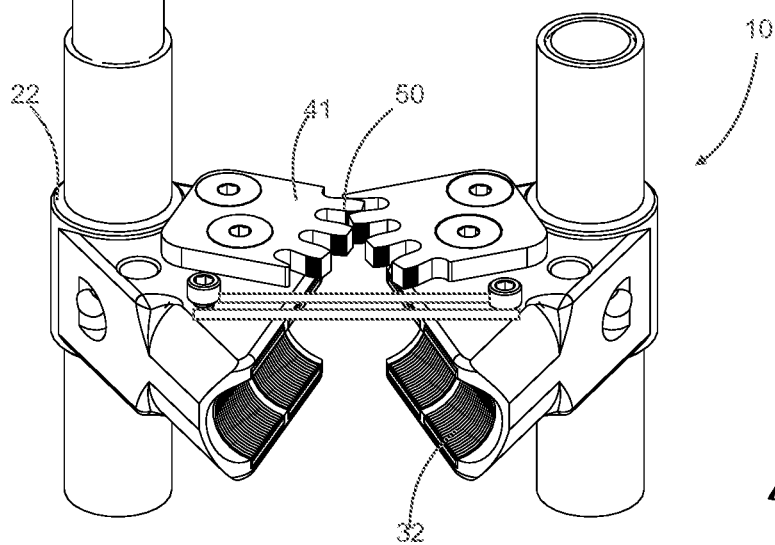
FIG. 4 is a perspective view of the timed pivot gripper system of FIG. 3 in an open position.
Figure 5:
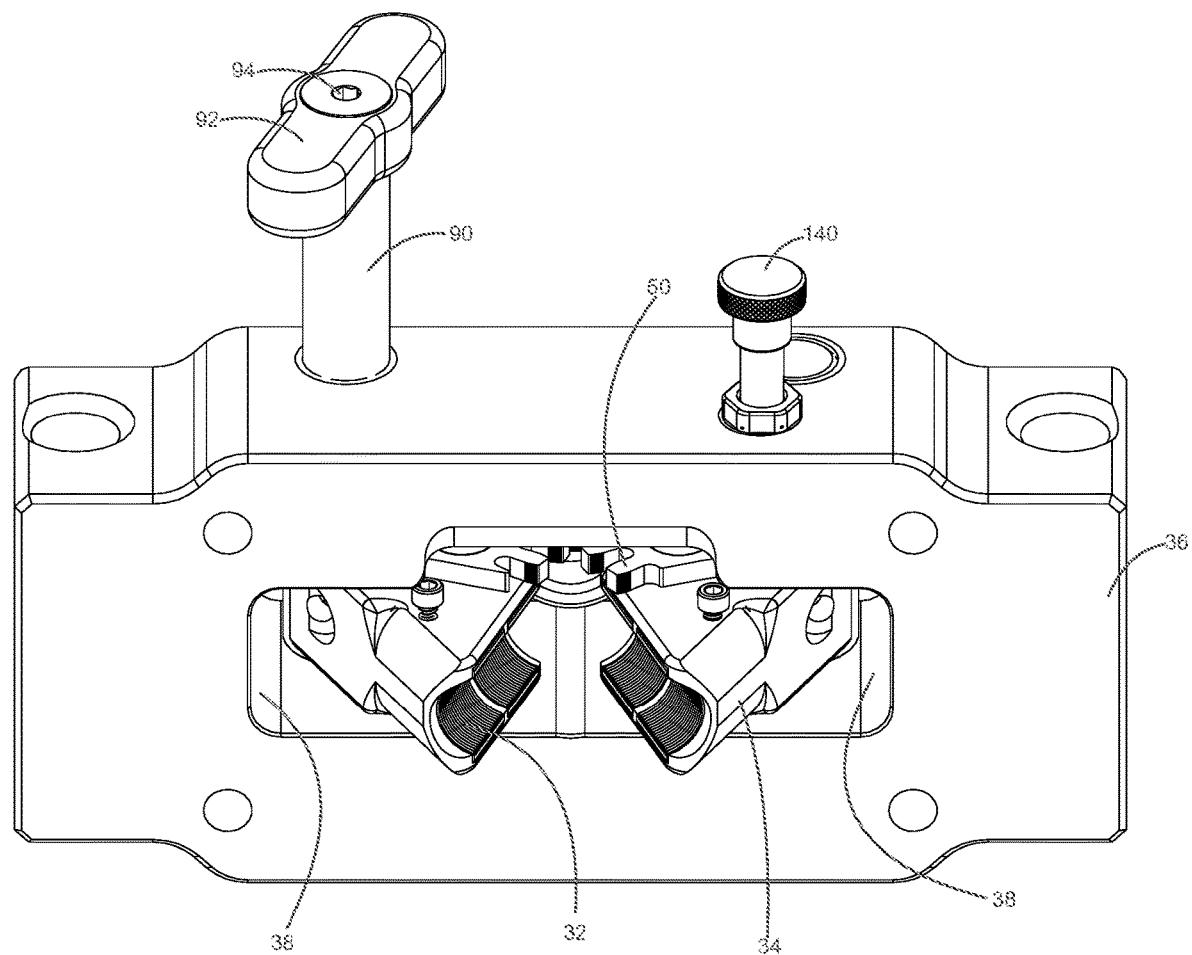
FIG. 5 is a perspective view of a timed pivot gripper system of the present disclosure in an open position, according to another embodiment of the present disclosure.
Figure 6:
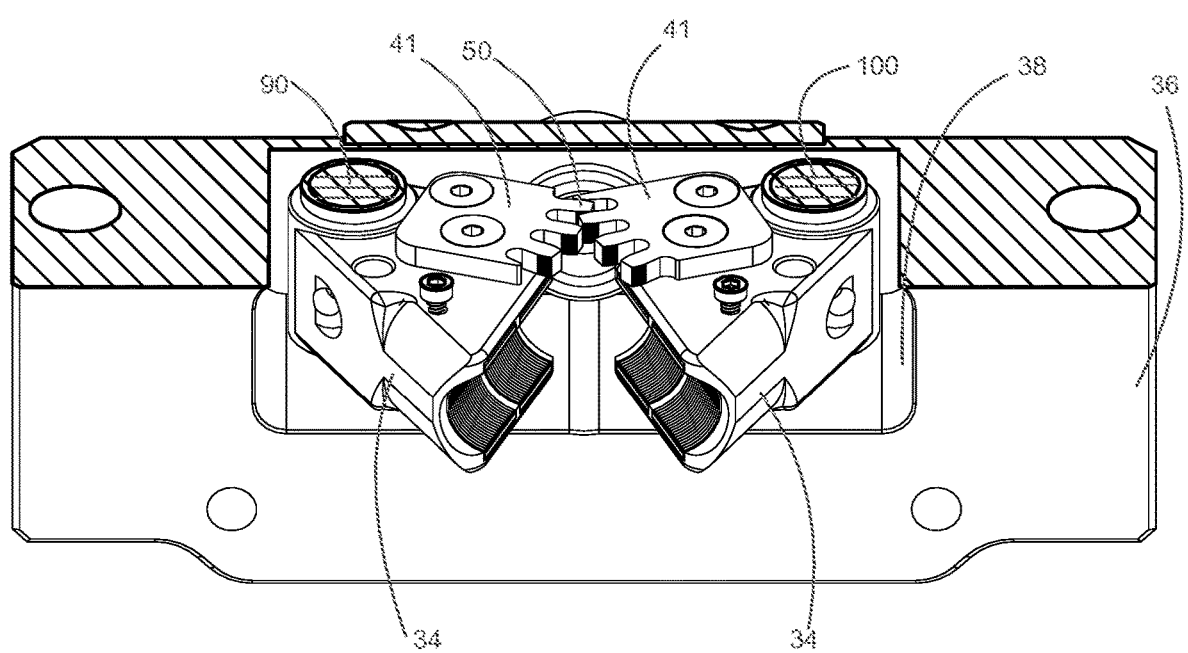
FIG. 6 is a cut-away view of the gripper system of FIG. 5.
Figure 7:
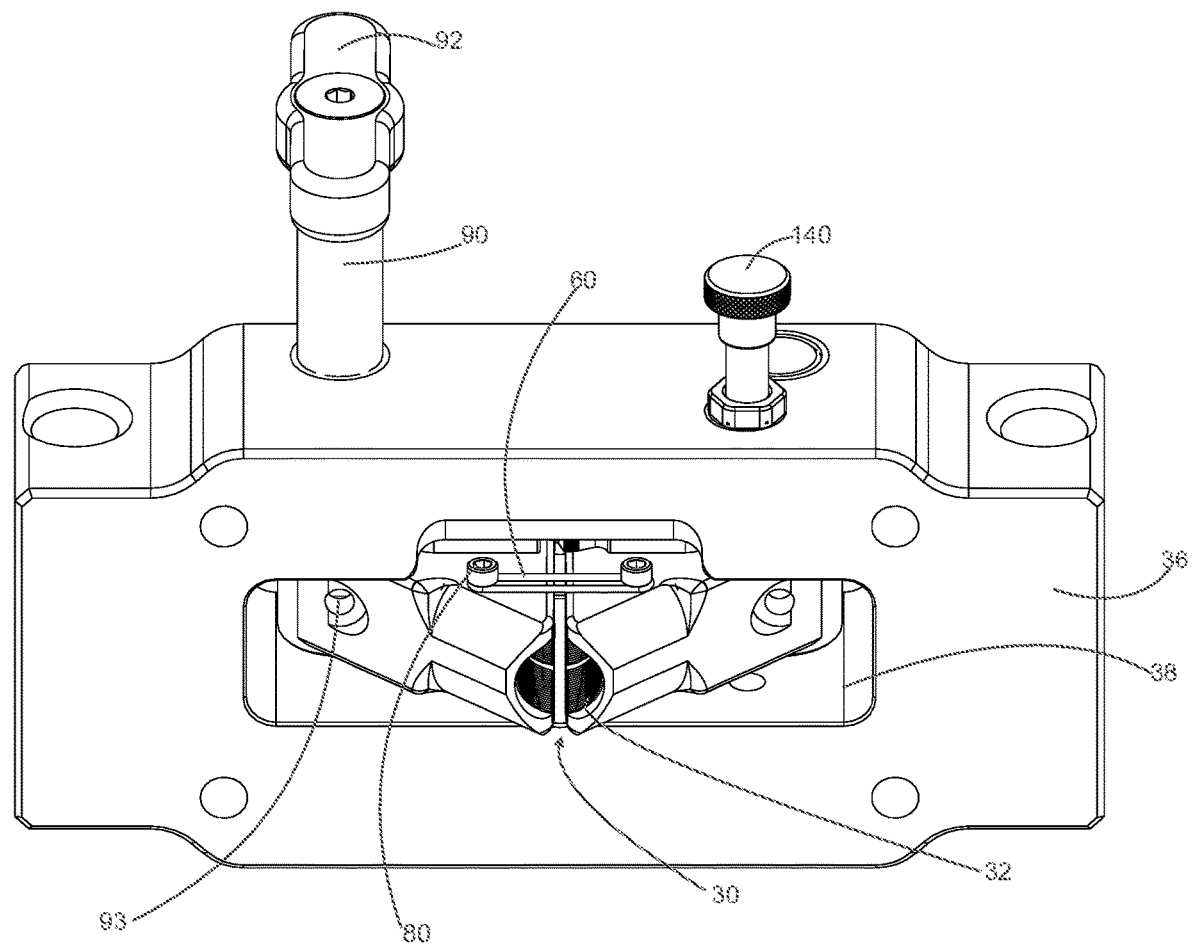
FIG. 7 is a perspective view of a timed pivot gripper system of the present disclosure in an closed position, according to another embodiment of the present disclosure.
Figure 8A:
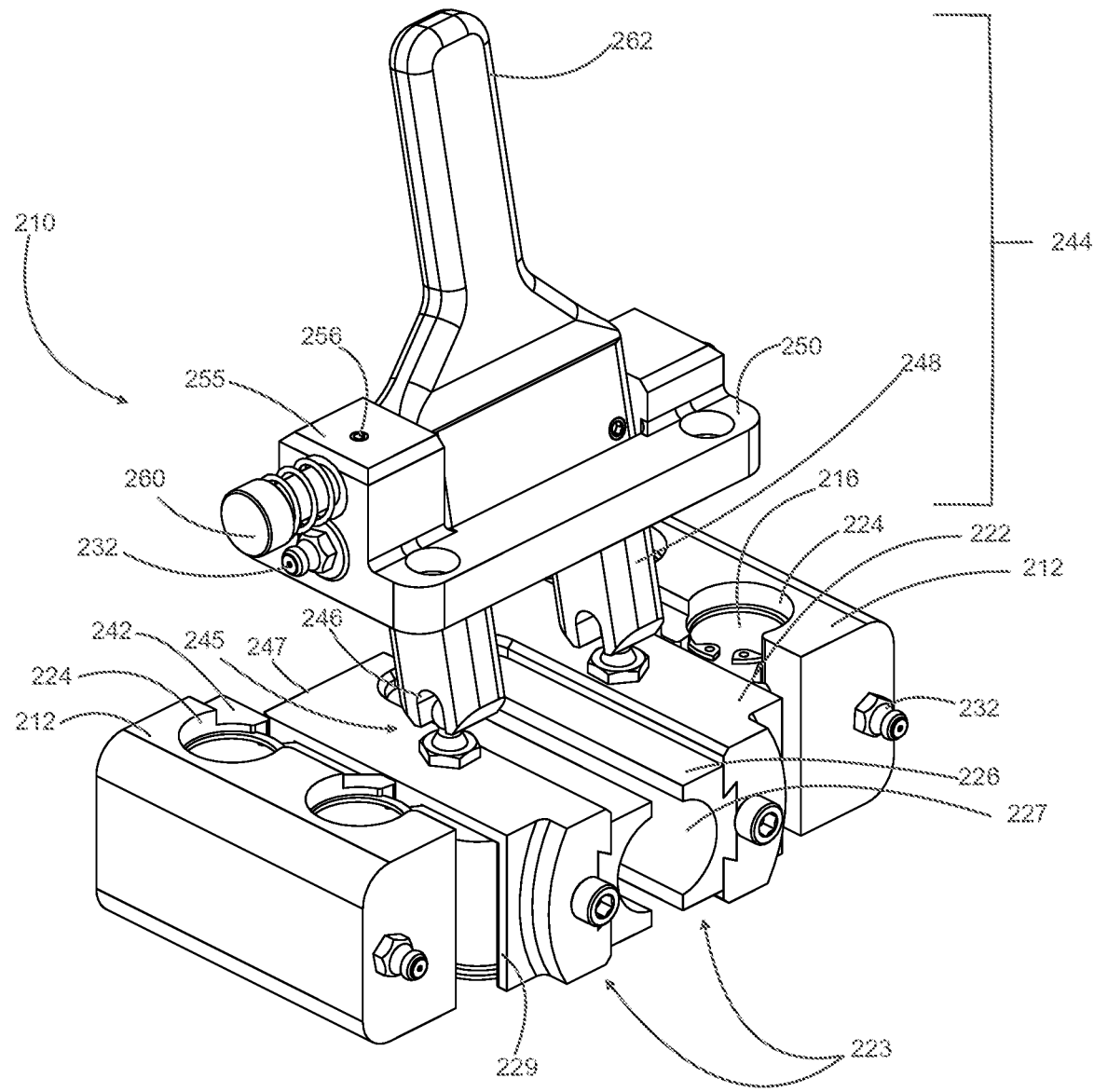
FIGS. 8A, 8B and 8C are perspective views of a hinge pivot gripper system according one embodiment of the present disclosure.
Figure 8B:
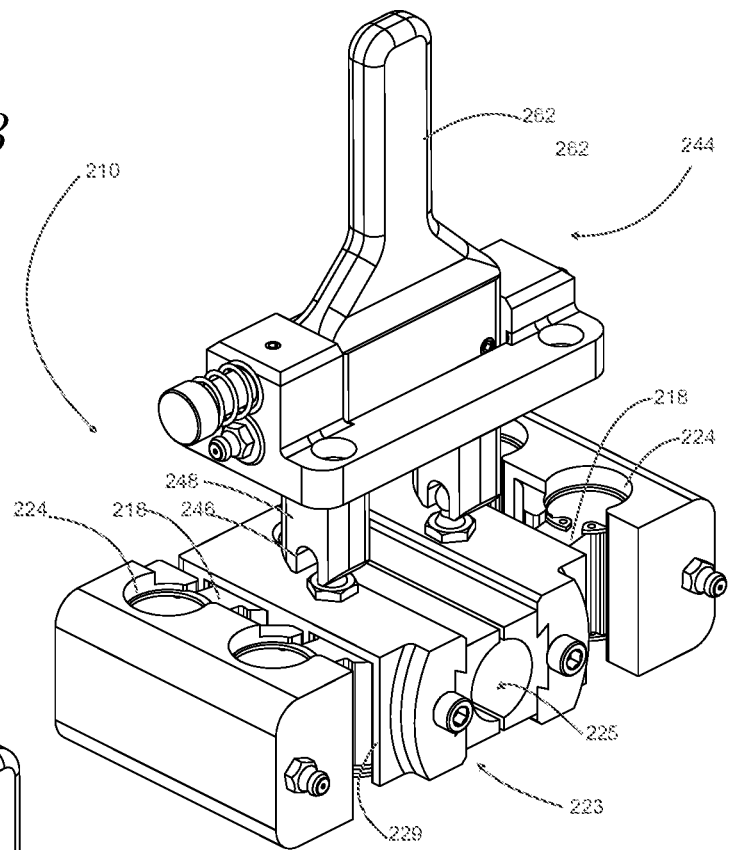
Figure 8C:
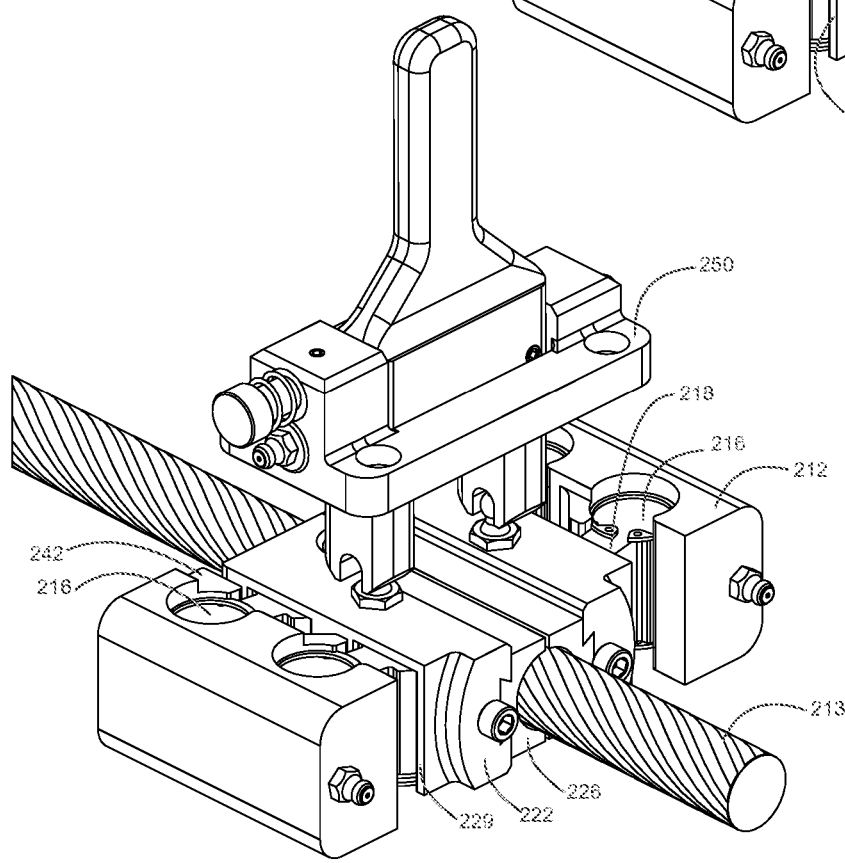

In another embodiment, wedge pieces 20 also can have means for modulating or limiting their rotation relative to one another. In one embodiment, means can be provided for keeping the pieces nominally engaged, for example by keeping gear segments 41 nominally engaged with one another. This allows for substantially easy and seamless alignment of the segments and pieces when one wedge piece is pivoted, without requiring gear teeth to "catch" on their own. One useful means for nominally engaging segments 41 is by means of some kind of tension-inducing tether, for example by means of an elastomer. In the figures, a tension bolt 80 extends up from the upper surface of wedge 20, by attaching to a bolt opening 82. An elastomer, such as an O-ring 60, then can be stretched across two opposing tension bolts, the elastomer's stretching capacity defining the limit to which wedges pieces 20 can be rotated away from one another via a pivot point 22. FIGS. 3 and 4 illustrate an embodiment where an elastomer 60 limits the cable surface aperture of the wedge pieces in the gripper assembly. In FIG. 3 the wedge pieces are in close proximity, the inner concave surfaces 32 together defining a channel for receiving a cable or wire rope. In FIG. 4, wedge pieces 20 are rotated away from one another via pivot point 22, and the central channel 30 is open via engagement of segment teeth 50, such that a cable easily can be added or removed.

In another embodiment, means for limiting cable gripper rotation can be achieved by creating an external boundary around their rotation. In FIG. 2, for example, a manifold or casing 36 has an opening dimensioned to receive a gripper mechanism 10 and has opposing surfaces 38 positioned and dimensioned to limit the degree to which wedge pieces 20 can rotate away from one another at a pivot point 22. That is, as the wedge pieces are rotated apart, an outer surface 34 of wedge piece 20 contacts casing wall 38, limiting further opening of the cable axial channel. See, for example, FIGS. 5-7.

Rotation of wedge pieces 20 about a pivot point can occur by any of a number of means, ease of operation being a primary consideration. In the figures pivot point 22 comprises a rotatable shaft 90 attached to wedge piece 20. In a preferred embodiment, shaft 90 is removably attached to wedge 20. In the figures, shaft 90 sits in a channel or aperture 22 (the pivot point) in wedge 20, and can be removably attached to wedge 20 by, for example, a set screw 93 that engages a set crew flat 96 on shaft 90. Of course, other means such as splines and keys, can be used to attach shaft 90 to wedge 20. Shaft 90 is readily moved by means of a handle 92, attached to shaft 90 via handle nut 94. Of course other pivot means and handle means are contemplated and within the skill of the art to fabricate, provided with the instant disclosure. In FIGS. 1-5, and 7, rotation of shaft 90 occurs mechanically by means of handle 92. Those skilled in the art will appreciate that other means of rotating shaft 90 or 100 are contemplated and within the skill in the art to design and fabricate, including using other mechanical means or non-mechanical means, such as hydraulic means.

In another embodiment, means for locking the timed wedge pieces of the instant gripper assembly into an open position also are provided by the instant disclosure. Locking the wedge pieces in an open position can be advantageous because it facilitates inserting and removing cable without needing separate means to keep the gripper pieces open and apart. This can be particularly difficult and cumbersome in vertical gripper systems in the art. In the figures, a pivot point shaft becomes a useful locking mechanism. Referring to FIGS. 1-7 wedge pieces 20 are mirror images of one another. Thus each wedge piece has an available pivot shaft opening or aperture. However, only one pivot shaft is needed since the two gear segments time the rotation of both wedges when pivot shaft 90 pivots its attached wedge piece. Accordingly, a second shaft 100 can be used on the opposing wedge as part of a locking mechanism. Like pivot shaft 90, locking shaft 100 can attach to its wedge piece by any means, including by means of a set screw. In addition, shaft 100 can include means for mechanically locking its attached wedge in an open position on demand. In the figures, shaft 100 is spring loaded, for example, by means of a locking pin 110, spring 115, retaining nut, 120, shaft 130, and rotatable knob 140. Of course, other means for achieving this locking function are within the skill of the art, given the instant disclosure, including fabricating a locking mechanism within pivot shaft 90.

One of the advantages of the gripper assemblies or systems of the instant disclosure and which distinguishes them over systems in the art is the added gripping value provided by the gearing mechanism. In the systems in the art, once the gripper system is in place on the wire surface and the cable is being pulled on, tremendous force is being applied at the front of the wedge and the cable is being held in place primarily by the biting capacity of the inner, concave, cable gripping surfaces. This causes great wear and tear on these surfaces and also can lead to cable fraying. In the assembly of the instant disclosure, by contrast, the timed gears, which are placed towards the rear of the wedge, helps keep the wedge pieces closed on the cable surface, with even pressure. This can provide more even gripping along the length of the wedge's cable receiving channel, providing better gripping and less wear on the cable biting surface. It also can allow for better and more precise modulation of the force translation onto the cable surface, thereby better preserving the cable's surface integrity and reducing any tendency to cause cable fraying.

II. Pivoting Hinge System

Referring now to FIGS. 8-17, various views and embodiments of a pivot hinge or joint means for transferring cable pulling force to cable grippers are shown. Referring first to FIGS. 8A-11, a releasable cable gripper mechanism 210 is provided. In the figures, the mechanism comprises a pair of parallel, opposing cable gripper members 223. As described in detail below, each member also can comprise a cable gripper insert 226 engaged with a cable gripper base 222.

Each cable gripper member 223 includes an inner, cable gripping edge or face 227 that extends along the gripper member's longitudinal axis, and an outer, opposing edge or face 229 where one or more pivot joints or hinges 214 attach. Inner cable gripping face 227 preferably defines a concave surface dimensioned to contact and engage a side surface of a cable or wire rope 213 and the two inner surfaces 227 of gripper members 223 together define an axial cable bore or channel 225 dimensioned to receive and engage a cable. It will be appreciated that inner surface 227 preferably is textured to enhance the surface's ability to dig into or "bite" the cable. One common means for creating a "biting" texture on a cable gripping surface is by forming a threaded or grooved texture, also known as "teeth", on the cable gripping surface.

Pivot joint or hinge 214 can comprise a shank or shaft 218 defining a link or linkage between two terminal pivot heads 216. Each terminal pivot head can fit into a recess or socket 224 in a separate component, linking the two components. Recess 224 is dimensioned to allow rotation of pivot head 216 in the recess by movement of shaft 218, specifically by rotation of shank 218 about the pivot head. It will be appreciated by those having ordinary skill in the art that pivot head 216 preferably is shaped to allow a single degree of rotational freedom in socket 224. It also will be appreciated that the pivot point is located substantially at the center of each pivot head along an axis perpendicular to the pivot shank longitudinal axis. In the embodiments depicted in the figures, the pivot point axis is vertical and perpendicular to the horizontally positioned pivot shank longitudinal axis.

In the figures, pivot head 216 is substantially cylindrical in shape and has an outer, convex, cylindrical camming surface 215 competent to slide along the concave inner surface of the corresponding cylindrically shaped hollow or socket 224 as the pivot head rotates in the socket. In the figures, pivot 214 links a gripper member 223 to a hinge base component 212, and rotation of pivot head 216 in socket 224 can move gripper member 223 relative to hinge base 212, and vice versa, via pivot shank 218. As discussed in detail below, in some embodiments it may be advantageous to hold the hinge pivot mechanism in a casing or manifold such that hinge base component 212 is stationary relative to gripper member 223.

Where hinge pivot mechanism 210 comprises part of a rear pulling gripper system, hinge pivot mechanism 210 advantageously can be housed in a casing that can comprise part of a pulling bridge and wherein pivot component 212 is held stationary. Commonly, the pulling bridge is engaged with a hydraulic cylinder rod and moves as a unit together with the rod as part of the pulling stroke. In this embodiment, during the cable pulling stroke, cable 213 is engaged in axial channel 225 formed by the pair of opposing gripper members 223 and each gripper member is linked along its outside longitudinal edge or face 229 to a stationary hinge base 212 by hinge pivot 214. During the pulling stroke, cylinder rod extension pulls the pulling bridge and associated hinge pivot mechanism, including stationary hinge base 212.

In a horizontal system the pulling bridge and associated hinge pivot mechanism are pulled rearward. In a vertical system, the bridge and mechanism are pulled upward. In a horizontal system, the rearward movement of hinge base component 212 allows rotation of the pivot head in the hinge base, translating the rearward pulling force into forward movement of pivot shank 218 and linked cable gripper 223 via rotation of pivot heads 216 in the pivot hinge and gripper member sockets 224. In a hinge pivot mechanism where the pair of opposing gripper members 223 each comprise one or a plurality of hinge pivots linking the gripper member outer face to a parallel stationary pivot base, the translated forward movement of pivot shank 218 and linked cable grippers 223 moves or forces the grippers' cable gripping surfaces further onto the cable, biting a cable side surface sufficiently to hold the cable and pull it rearward with the pulling bridge during the cylinder rod extension stroke.

During the recovery stroke, the pulling bridge and attached hinge pivot mechanism retract together with the retracting cylinder, meaning they move forward relative to the pulling apparatus in a horizontal system. Now the forward movement of the pulling bridge and attached stationary hinge base translate into rearward movement of shank 218 and associated cable gripper 223 via rotation of the pivot heads in the pivot hinge and cable gripper pivot sockets 224, pulling grippers 223 rearward and off the cable surface, and opening axial channel 225.

Where hinge pivot mechanism 210 comprises part of a front holding gripper system, hinge pivot mechanism 210 advantageously also can be housed in a casing wherein pivot component 212 is held stationary. One non-limiting example of a holding gripper casing is illustrated in FIGS. 13-17, where manifold bushing 270 and bushing plate 266 indicate the front edge or face of the manifold or casing 264. Commonly, the holding gripper casing and assembly are a stationary component on the pulling apparatus. During a cable pulling stroke, cable 213 is being pulled rearward through the hinge pivot mechanism's axis channel 225 in the holding gripper casing by the hydraulic cylinder and pulling bridge extension described above. The rearward pulling force on cable 213 pulls the gripper members forming axial channel 225 rearward, allowing rotation of the pivot heads 216 in gripper and pivot hinge sockets 224, translating the rearward cable pulling force into rotational movement of pivot shank 218 about the pivot head pivot points. Since linked hinge base 212 is held stationary, rotation of shank 218 translates into rearward rotational movement of shank 218, promoting rearward movement of gripper members 223 off the cable surface and the opening of axial channel 225. In this way, cable 213 is free to pass through the holding gripper unimpeded during the cable pulling stroke.

During the recovery stroke, the pulling force on cable 213 is released. The cable, which may have been stretched during the pulling stroke, may even contract at this point, possibly initiating a forward pulling force on the cable. In the absence of a rearward pulling force, gripper members 223 in a front holding gripper system are no longer incentivized to move rearward, allowing reverse rotation of pivot heads 216 in sockets 224 and forward movement of pivot shank 218. In addition, any forward cable pulling force from a contacting cable is translated into forward movement of pivot shank 218. The translated forward movement of pivot shank 218 and linked cable grippers 223 moves or forces the grippers' cable gripping surfaces further onto cable 213, biting a cable side surface sufficiently to hold the cable and prevent backward slipping of the cable during the recovery stroke.

It will be appreciated by those skilled in the art that a plurality of pivot joints disposed along gripper member outer surface 229 to link gripper member 223 to hinge base component 212 can advantageously support alignment and even placement of a gripper member cable engaging surface 227 onto a cable side surface, and release therefrom, the plurality of hinge pivots distributing the force translation along the length of gripper member 223. As also will be appreciated by those skilled in the art, substantially even force translation along the length of gripper member 223 can reduce the likelihood of excessive engagement of cable gripping surface 227 with a cable side surface, substantially reducing occurrences of gripper seizing (e.g., failing to disengage from a cable side surface) and/or cable fraying (e.g., cutting into one or more strands on a cable side surface caused by excessive "biting" into a cable). In addition, providing a plurality of hinge pivots distributed along gripper member edge or face 229 can keep cable gripping inner surfaces 227 of the opposing pair of gripper members substantially parallel to one another as the gripper members are moved onto or off the cable side surface. In the figures, two hinge pivots are disposed along gripper member outer edge or face 229. It will be appreciated that the plurality of hinge pivots can include more than two hinge pivots, including where the use of long axial channels are desired. It also will be appreciated that the preferred number, size and dimensions of hinge pivots 214 as linking mechanisms on a cable gripper system can vary depending on various system particulars chosen, including the cable pulling forces to be applied, cable dimensions, and apparatus component dimensions, and which can be determined without undue experimentation by a fabricator provided with the instant disclosure.

FIGS. 12A and 12B provide exploded views of hinge pivots 214 and sockets 224, and illustrate two non-limiting examples of means for retaining pivot head 216 in socket 224. Pivot head retainers can be used advantageously to inhibit vertical movement of the pivot head and the hinge pivot during operation. Preferably, pivot head retainer means are provided to limit both upward and downward vertical movement. In one embodiment, the pivot head retainer means can comprise a mechanical retainer means, such as a groove 230 in the socket concave inner surface, dimensioned to receive a mechanical pivot head retainer, one non-limiting example of which can include a retaining ring or circlip 228. Preferably, groove 230 can be positioned near the upper or bottom edge or limit of the socket, beyond the maximum vertical dimension of pivot head 216 and mechanical pivot head retainer 228 can act as a mechanical lid or pivot head cover. In another embodiment, the pivot head retainer can be provided structurally by, for example, the component housing socket 224. FIG. 12A shows a gripper base 222 wherein socket or recess 224 extends through the bottom surface of base 222 but not the upper surface, and the upper surface can act as a lid or structural retainer 231, preventing upward vertical movement of pivot head 216. In the gripper base 222 illustrated in the figure, socket 224 can comprise a single groove 230 disposed near the bottom edge of the socket and dimensioned to receive a mechanical retainer 228 for inhibiting downward movement of the pivot head, upward movement being inhibited by structural retainer 231. In FIG. 12B, both upward and downward pivot head movement is inhibited by grooves 230 and mechanical retainers 228. It will be appreciated that socket 224 also can be fabricated to comprise a top and bottom structural pivot head retainer.

The hinge pivot cable gripper mechanism disclosed herein further can include integrated lubricating means. In particular, lubricating and/or anti-seize fluid or lubricant can be provided externally to sliding outer convex pivot head surface 215 and socket 224 concave inner surface and reduce friction therebetween, without requiring disengagement of the hinge pivot from the mechanism. In one non-limiting example, illustrated in FIGS. 9B and 10, an integrated grease or Zerk fitting 232 can be provided to hinge base 212. A lubricating or anti-seize fluid then can be supplied to an outlet or opening 239 on pivot head 218, for example by means of pivot base channel 234, pivot base channel exit 236, and hinge pivot channel 238.

The hinge pivot mechanism of the instant disclosure also can include means for limiting gripper member movement on or off the cable surface. For example, when large pulling forces, e.g., 30+ tons of pulling force, are being used, it may be advantageous to limit the degree to which gripper members can move forward onto the cable or to otherwise come together in a fully closed position, thereby reducing the opportunity for cable seizing or excess biting of a cable surface. As used herein, a "fully closed" position can be defined as where hinge pivot shank 218 is substantially at or close to a 0° horizontal position relative to hinge base 212 and gripper member 223, and/or the vertical plane defined by the hinge pivot's two terminal pivot points. A 0° horizontal position also can be understood to be a 900 or perpendicular position relative to the hinge base or gripper member longitudinal axis or a pivot point vertical axis. It will be appreciated by those skilled in the art that a nominal degree of variation from substantially 0° can facilitate release of the cable gripper from a cable surface. In one embodiment, useful limiter means keep the pivot shank at least about 5° from 0° horizontal. In another embodiment, useful limiter means keep the pivot shank in the range of at least about 5-15° from 0° horizontal.

Figure 9A:
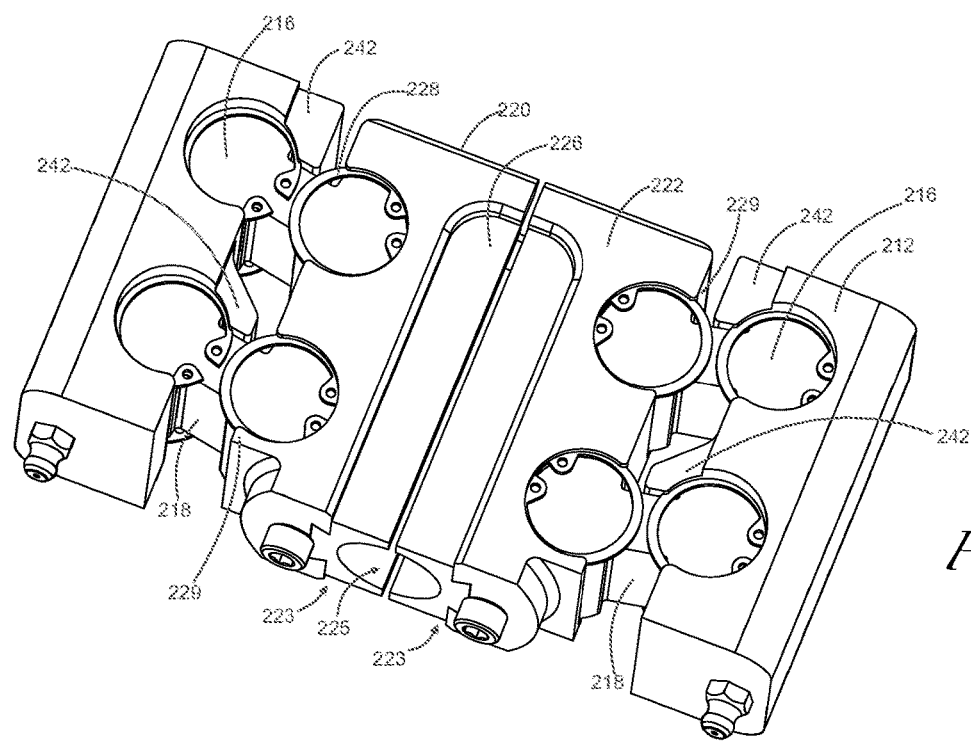
FIGS. 9A and 9B are a bottom perspective and cut away view, respectively, of a hinge pivot gripper system according one embodiment of the present disclosure.
Figure 9B:
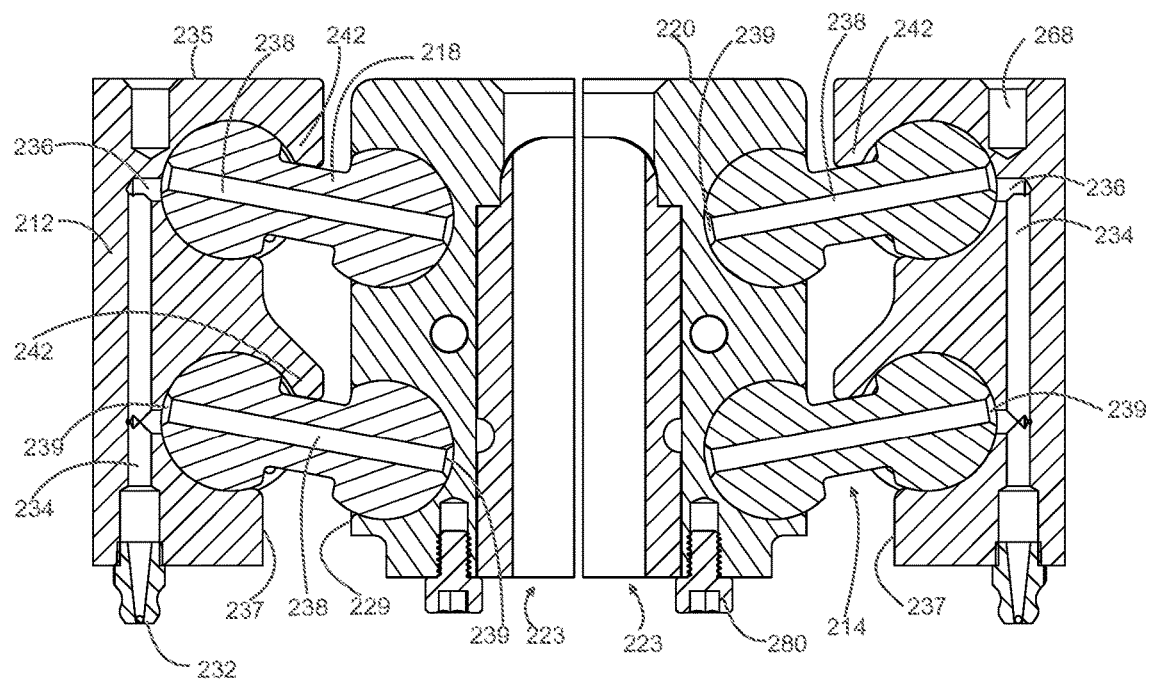

FIGS. 9A, 9B and 13 illustrate non-limiting examples of gripper limiting means that can be used to advantage. Other gripper limiting means, including gripper limiting means dimensions and positions, also are within the skill of the art to fabricate, provided with the instant disclosure. FIGS. 9A and 9B illustrate one non-limiting example wherein the gripper limiting means are provided by structural stops or limiters 242 that contact pivot shank 218 directly. In the figures, limiter 242 extends out from the hinge base component, specifically from hinge base inner attachment edge or face 237, dimensioned and positioned to contact pivot shank 218. In one embodiment, limiter means 242 can contact shank 218 substantially at or near the shank's longitudinal center. In still another embodiment the shape of the terminal free end of limiter 242 can be cut to mirror corner 219 formed by the hinge pivot shank and pivot head. In another embodiment, limiter 242 can create a stop that keeps pivot shank in the range of at least about 5-15° from 0° horizontal. In another embodiment, limiter 242 also could extend from gripper member 223. It will be appreciated that the preferred dimensions and positioning of limiter 242 on pivot shank 218 can be varied depending on the size and shape of the pivot mechanism components to be fabricated and on the pulling forces to be used, and these variations are within the skill of the art to determine provided with the instant disclosure.

FIG. 13 illustrates another limiter means 233. Here the limiter means limits the rotation of pivot shank 218 indirectly, by limiting forward longitudinal movement of gripper member 223. In one embodiment, limiter 233 can comprise a structural stop 233 positioned at the front end 220 of gripper member 223 and which limits forward movement of gripper member 223 towards casing front edge or face 221. In one embodiment, limiter 233 can be integral to gripper component 223 and extend forward from component front edge or face 220. In another embodiment, limiter 233 can be integral to casing front edge or face 221, and extend rearward from the casing front face inner surface. In still another embodiment, limiter 233 can be integral to hinge base component 212, extending horizontally from the component's front face or edge 235, such that limiter 233 contacts gripper front edge 220 and limits the gripper's forward longitudinal movement thereby.

The hinge pivot mechanism of the instant disclosure also can include means for linking, tethering or otherwise joining gripper members 223 such that movement of the grippers is timed or coupled and they move substantially in unison on and off a cable surface. Characteristics of a useful, timed gripper linking or joining means can include a gripper engagement means that allows both longitudinal and lateral movement of the engaged gripper member. In one non-limiting example, illustrated in FIGS. 8A-8C and FIGS. 15A-15B, the gripper linking means can include a mechanical yoke, including a fork 244 comprising two rigid terminal free ends or legs 248, each free end engaging a gripper member 223. One gripper engaging means can include a ball and socket joint 245 that allows at least two degrees of rotational freedom.

In one preferred embodiment, illustrated in the figures, the gripper member contact or engagement point can include a ball or stud 240 that extends out from a surface of gripper member 233. In another embodiment, the gripper engaging means at the terminal free end of fork leg 248 can include a ball socket 246 dimensioned to allow both rotation and lateral movement of stud 240. In one embodiment, socket 246 can comprise a channel or groove that extends the width of the terminal free end of fork leg 248 so that stud 240 can travel laterally along the inner surface of the socket, accommodating lateral movement of gripper member 223 on and off a cable surface, as well as longitudinal movement of the gripper. It will be appreciated that in another embodiment, socket 246 could be on gripper member 223 and ball or stud 240 could extend from the terminal free end of fork leg 248. In the figures, the gripper linking or timing means, including fork 244 and the gripper connection means, extend vertically from the upper surface of gripper members 223. It will be appreciated that the linking or timing mechanism for substantially unifying or coupling gripper movement can be located elsewhere on the grippers including, for example, extending horizontally out from the front edge or face 220 of the gripper member.

As illustrated in the figures, mechanical yoke, coupling means or fork 244 can include a handle or lever means 262 for manual manipulation of the gripper members, for example to open cable channel 225 for introducing or removing a cable from the channel. In addition, a mechanical means for locking the cable grippers into an open position can be provided advantageously through coupling means or fork 244 and/or lever or handle means 262. A used herein, an open position is understood to mean when gripper members 223 are moved laterally apart from one another to open axial channel 225 and enlarge the central bore to facilitate inserting or removing a cable or wire rope 213.

Figure 16:
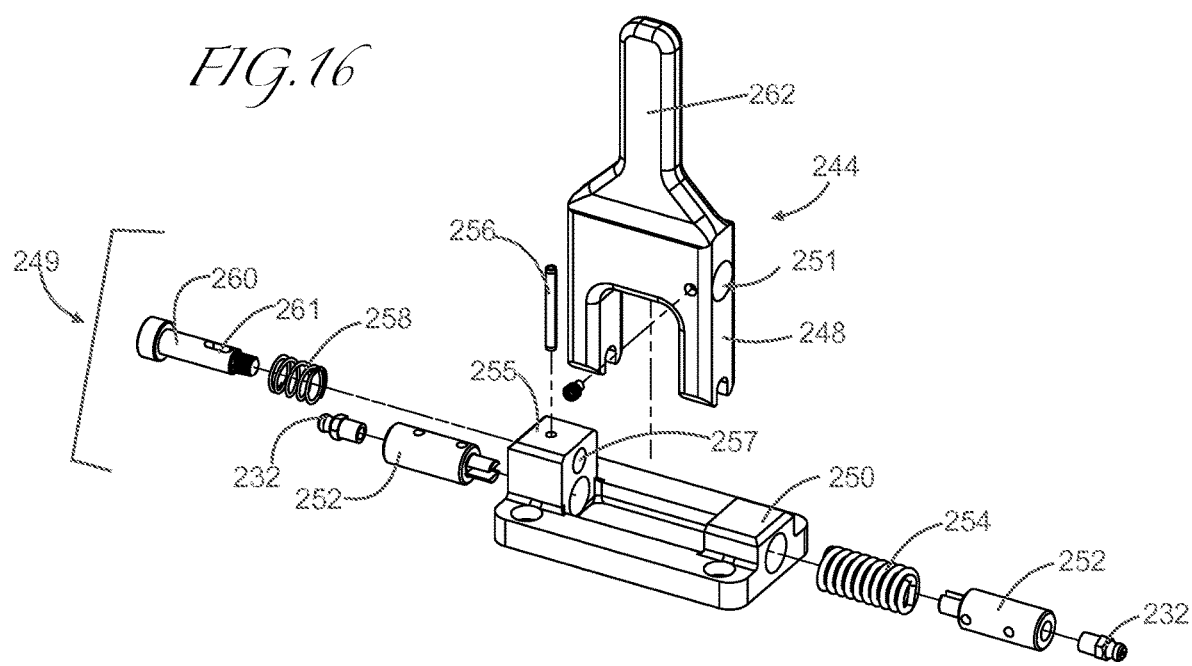
FIG. 16 is an exploded view of a timing lever according to one embodiment of the present disclosure.
Figure 17:
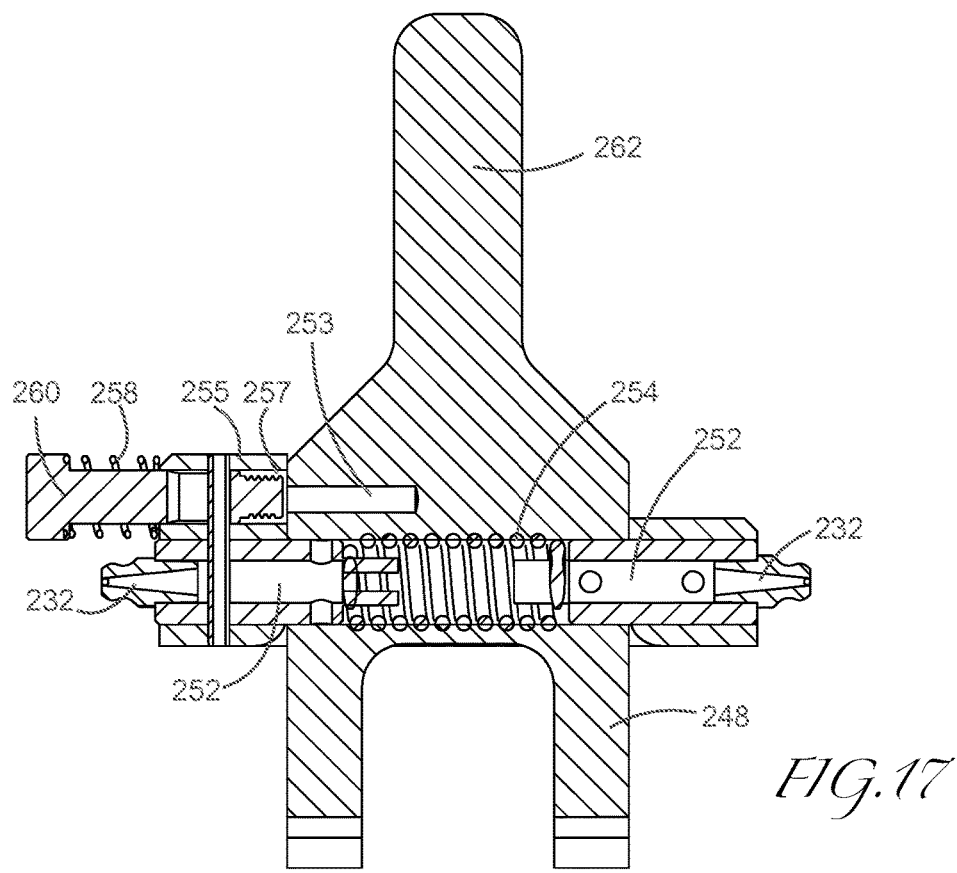
FIG. 17 is a cut-away view of a timing lever according to one embodiment of the present disclosure.

FIGS. 16 and 17 illustrate one embodiment of a useful lever locking mechanism. As will be appreciated by those skilled in the art, the locking mechanism also can be part of a tensioning mechanism 249. Tensioning mechanism 249 can support keeping fork 244 actively engaged with the gripper connection means, facilitating the start of the load transfer that promotes rearward movement of gripper members of a cable or wire rope surface. In particular, and as described in detail below, active engagement can support release of the gripper members off the cable surface through force transfer from the tension mechanism 249 through fork legs 248 to socket joint 245 and engaged gripper member. One non-limiting example of a useful tensioning mechanism and lever lock device is illustrated in FIGS. 15A-17. It will be appreciated that, provided with the instant disclosure, other mechanisms and devices can be fabricated without undue experimentation that achieve similarly successful results. For example, one alternative to a lever means can include a pin and fork.

In the figures, coupling fork 244 can include an internal channel 251 for housing tensioning mechanism 249 which can provide resistance to lever or coupling fork movement about the fork's fulcrum. It will be appreciated that release of the torsional force held by tensioning mechanism 249 can be translated to ball and socket joint 245 via coupled fork legs 248, facilitating longitudinal movement of gripper members 223. In one embodiment, tensioning mechanism 249 can comprise a torsional spring 254 dimensioned to fit in channel 251 and that can engage at its terminal ends with opposing spring tensioners 252. Tensioning mechanism 249 further can include integrated lubricating means such that lubricating and/or anti-seize fluid or lubricant can be provided externally to tensioning channel 251 and the components therein, for example by means of a lubricating zerk 232.

One non-limiting example of a latching or lock mechanism for holding the gripper members in an open position can include a pin 260 dimensioned to fit into a cavity 253 in fork 244 or its lever 262. In one embodiment, pin 260 can reside in a channel 257 of a holding block 255 adjacent cavity 253, and cavity aperture 251 comes into alignment with channel 257 and pin 260 when lever 262 is maneuvered forward opening axial channel 225. Pin 260 then can be moved or thumb-pushed into cavity 253 through channel 257. Internal tensioning mechanism 249 can exert sufficient rearward torsion pressure on fork 244 and pin 260 to retain the pin in cavity 253 and hold fork 244 in the open position. Releasing the tension on pin 260, for example, by further forward extension of lever 262, can release the torsion force on pin 260 for easy removal. In one embodiment, pin 260 can include a compression spring 258 about its outer axial surface, and pushing pin 260 into cavity 253 compresses associated spring 258. When lever tension on engaged pin 260 is released by further forward extension of lever 262, compression spring 258 can decompress, allowing pin 260 to self-release from cavity 253.

In still another embodiment, pin 260 further can include a means for limiting the horizontal movement of pin 260, for example to retain pin 260's engagement with block 255 and channel 257. In the figures, pin 260 can include a slot 261 along the pin's longitudinal axis for receiving a vertical limiting pin 256 which engages with pin 260 via slot 261 and remains associated with pin 260 as the pin travels in and out of cavity 253. As will be appreciated by those skilled in the art, the tensioning and latching mechanisms can be made integral to lever 262 or can engage with fork 244 by means of a support plate or spring plate 250, as illustrated.

FIGS. 13-15B illustrate a non-limiting example of a gripper hinge pivot mechanism 210 in a casing or housing 264, also referred to herein as a manifold. In the figures, spring plate 250 can provide bolting means for fastening lever 262, and housing 264 can include an aperture 269 through which lever legs 248 can extend and engage with gripper studs 240. Casing 264 further can comprise a front bushing 270, bushing plate 266, and bolting means 268. Hinge pivot mechanism 210 can fit in a recess 217 in casing or manifold 264. In the figures, recess 217 is dimensioned such that hinge base 212 is held stationary by the recess relative to linked gripper member 223. In another embodiment a gap 265 can be maintained between gripper front edge or face 220 and casing front wall 221, by a pivot rotation limiter means. Casing 264 further can comprise means for attaching to a cable pulling apparatus and/or can comprise part of a hydraulically driven cable pulling bridge.

Gripper Inserts.

Figure 10:
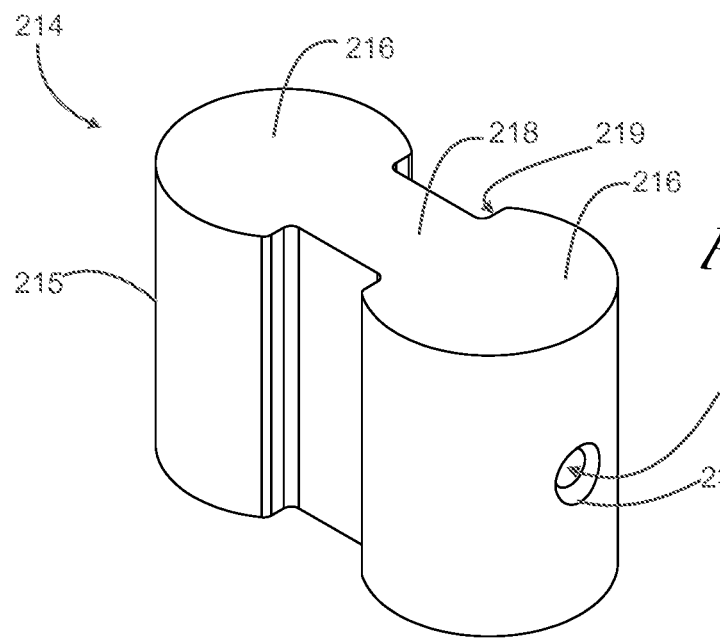
FIG. 10 is a view of a hinge pivot according one embodiment of the present disclosure.

Gripper member 20 or 223 can comprise a single unit or include a gripper insert and a gripper body or base. FIG. 2 illustrates one embodiment of a gripper insert 32 and a gripper body 34. FIG. 10 illustrates another embodiment of a gripper insert 226 and a gripper body or base 222. A detailed description of gripper inserts is disclosed in U.S. patent application Ser. No. 15/681,048, filed Aug. 18, 2017, the disclosure of which is incorporated herein by reference.

Using cable gripper inserts can be advantageous as it can allow the gripper member's cable gripping surface and gripper body to be composed of independent materials best suited for each component's function. In particular, a cable gripper body typically is engineered and fabricated to absorb and sustain loads that cable pulling requires, and the ferrous metal selected, typically steel, preferably is soft enough to absorb these loads. Conversely, cable gripping surfaces preferably comprise a hard metal competent to maintain the texturing or "teeth" on the gripper surface that "bite" into the cable during a cable pulling operation. By selecting individual metals that best match the different function of gripper body 222 and gripper insert 226, one can fabricate and/or select a gripper member 223 and cable gripper system 210 of enhanced integrity, longevity and stability. In the pipe bursting and trenchless pipe replacement industries, useful insert metals can include metals having a Rockwell rating greater than 62. Carbide steel, for example, may be used to advantage. Gripper bodies can be fabricated of a metal having enhanced load bearing capacity. Such metals may have a Rockwell hardness rating of 41 or below. In addition, a variety of metal curing or heat treatments can be used, particularly for the fabrication of gripper bodies. Moreover, by using removable inserts, the longevity of the gripper member is enhanced and conserved because only the insert needs to be replaced in the event the textured surface or teeth become worn on the cable gripping surface.

Referring to FIG. 2, one embodiment of a useful cable gripper insert is shown. In the figure, cable gripping surface 32 comprises at least one insert 16 that sits in a recess 18 of wedge piece 20. Thus insert 16 itself comprises an outer, gripper body engaging surface 17 dimensioned and configured to sit in recess 18, and an inner, cable engaging surface 32, typically textured or threaded to bite the cable. Thus the gripper comprises means for receiving a cable gripping insert. In the embodiment in the figure, two inserts are shown. As will be appreciated by those skilled in the art, fewer inserts (e.g., one) and more inserts (e.g., three or more) also can be used to advantage.

In the figure the gripper body insert receiving surface comprises one or more recesses 18 dimensioned to receive the insert. In the figures the insert recess surface comprises a series of recesses or channels dimensioned to receive the individual inserts and the channels (and the inserts they hold) are separated by dividers or steps in the recess axial opening. The dividers provide means for holding the insert(s) in position in the recess. The cable engaging surface of the dividers also is configured to engage the cable and can be textured or threaded to bite the cable. Means can be provided for further affixing the insert in position in the recess or channel using, for example, epoxy or silicon.

Figure 11:
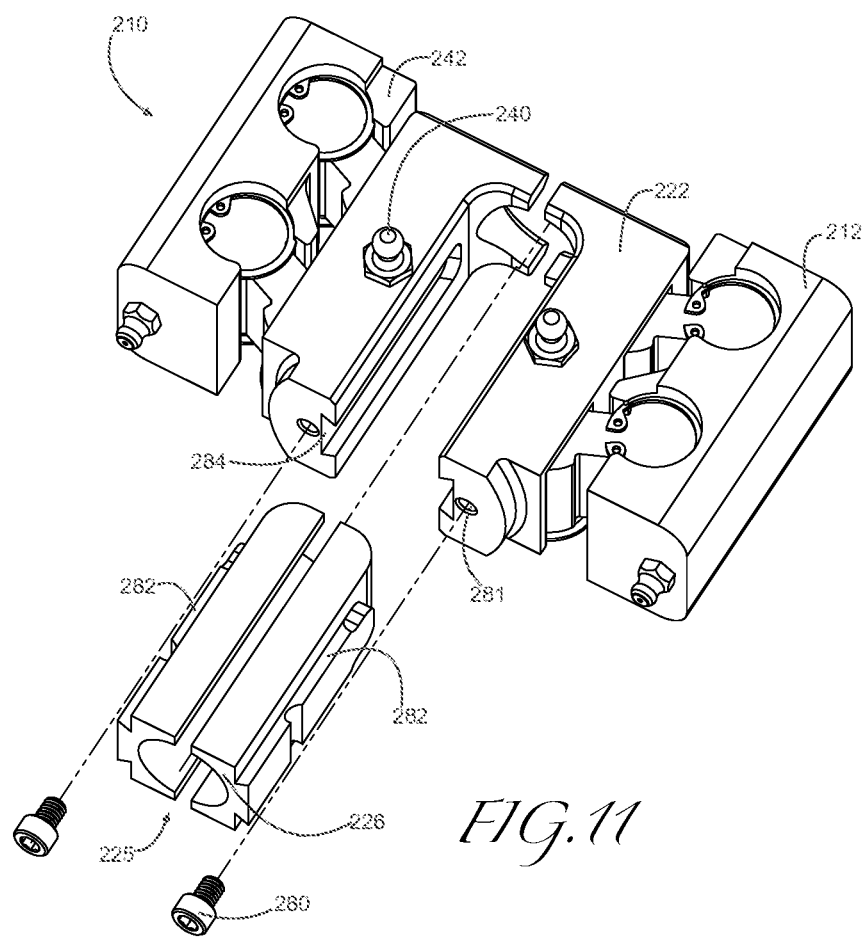
FIG. 11 is an exploded view of the gripper mechanism illustrated in FIGS. 8A-8C.
Figure 14A:
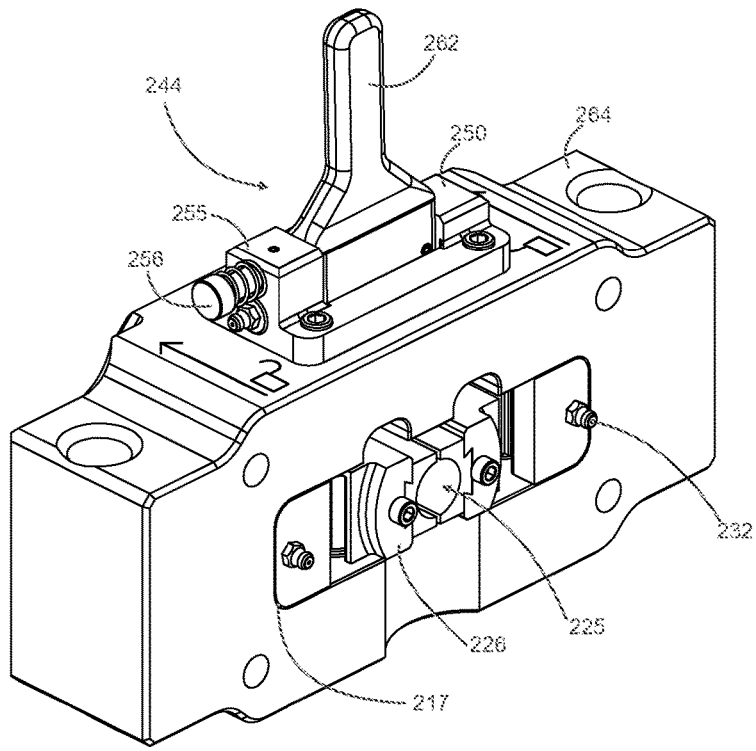
FIGS. 14A and 14B are perspective and exploded views of a hinge pivot gripper system and casing according one embodiment of the present disclosure.
Figure 14B:
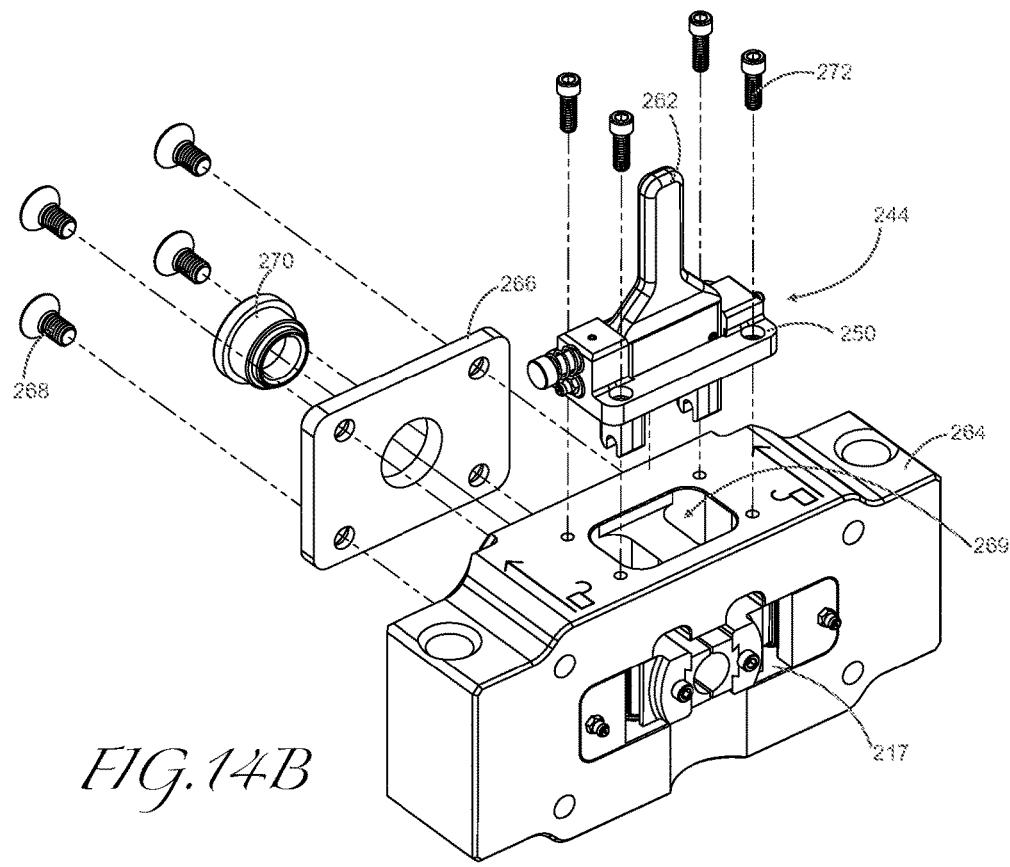

Referring to FIG. 11 another embodiment of useful gripper inserts is illustrated. In the figure, a gripper insert 226 can be removably coupled to gripper body 222 by mechanical engaging means. In one example, illustrated in the figure, a projection 282 on one surface engages with a mirroring groove or slot 284 on the other surface, as in a dovetail or key-and-groove type joint. In the figure, the projection, also referred to herein as the joint's key or tongue or dovetail 282 can extend down the outside side surface of insert 226. Projection 282 dimensionally matches a slot or groove or channel 284 that extends down the inner side surface of gripper body 222 such that insert 226 is coupled to gripper body 222. The gripper body and insert further can be engaged by standard mechanical means, including a pin, including a compressible spring or roll pin, to limit longitudinal movement of insert relative to body. In one embodiment, mechanical engagement can occur via the key-and-groove joint.

Choice of materials for fabricating the mechanisms and devices disclosed herein are within in the skill of the art to determine, with attention given to selecting materials of suitable strength, load capacity and durability, among other standard criteria. Material considerations include durability and strength. Useful materials include steels and steel alloys.

III. Examples

The examples which follow make reference to components illustrated in the figures described above. It will be appreciated that the order of operations or acts described sequentially in the examples that follow may in some cases be rearranged or performed concurrently.

1. Pivoting Gripper System

A gripper system 10 can be assembled and installed into a cable pulling device or apparatus. In one example illustrated in FIG. 2, gear segments are attached to gripper members 20 and then installed in the apparatus, for example, by passing shafts 90 and 100 through apparatus casing or manifold openings 35 into their pivot point apertures on their respective opposing gripper member wedge pieces 20. The shafts can be secured to members 20 by means of a set screw 93. The gripper member wedge pieces can be rotated until the gear teeth are nominally engaged and an elastomer or O-ring can be extended over tension bolts 80 (or this step may happen before the wedge pieces are placed in the casing opening), such that lateral rotation of wedge pieces 20 is limited. The wedge pieces are rotated into an open position and, if desired, locked in the open position by, for example, rotating locking mechanism knob 140 and engaging spring-loaded locking pin 110. A cable or wire rope then is inserted in the opening between the wedge pieces; the locking mechanism disengaged, and pivot shaft 90 rotated to close the wedge pieces and bring the inner concave surfaces of each wedge onto the wire rope surface.

2. Hinge Pivot System

A gripper hinge pivot mechanism 210 is provided in a manifold 264 in a holding gripper position on a cable pulling apparatus. It will be appreciated that in a horizontal cable pulling apparatus the holding gripper manifold typically is referred to as the front gripper mechanism. In a vertical pulling system the holding gripper mechanism typically is referred to as the lower gripper system. It also will be appreciated that hinge pivot mechanism 210 has utility in both a vertical and a horizontal system, and as part of a cable pulling gripper mechanism or a holding gripper mechanism. In this non-limiting example, gripper mechanism 210 is part of a front holding gripper mechanism on a horizontal cable pulling apparatus.

The hinge pivot mechanism is provided in a "closed" position. In this position, spring loaded fork 244 is in a vertical position, hinge pivots 212 are in the maximum allowable horizontal position permitted by pivot limiter 242, and gripper members 223 are in their most proximal position, their inner surface edges or faces together defining axial channel 225. In this example, the maximum allowable hinge pivot horizontal position is in the range of about 5-15° from 00 horizontal. A cable or wire rope is engaged with the gripper mechanism as follows. Spring-loaded fork 244 is maneuvered from a vertical position forward by means of lever 262 such that lock pin cavity 253 on fork 244 aligns with channel 257 in block 255 on spring plate 250. Lock pin 260, engaged in channel 257 then is pushed inward to engage with cavity 253, locking fork 244 in the forward position. Forward movement of lever 262 also moves fork legs 248 rearward, along with attached gripper members 223, via ball and socket joint 245, allowing axial channel 225 to open and create a gap. The hinge pivot gripper mechanism now is in a locked, "open" position.

A cable or wire rope 213 now is inserted into the opened axial channel. Following insertion of the cable, lever 244 is unlocked by disengaging lock pin 260 from cavity 253, for example, by forward extension of lever 262 to release torsional force on pin 260 and extracting pin 260 from cavity 253. Unlocked, spring-loaded fork 262 reverts to a vertical position, pulling legs 248 forward, and with them, attached cable grippers 223. Forward movement of grippers 223 initiates rotation of pivot hinges 212 about their pivot heads 216, which action allows the gripper members to move laterally or horizontally inward and forward until hinge pivot movement is stopped by pivot limiter 242. Forward movement of gripper members 223 brings the gripper inner surfaces together, reforming axial channel 255 and bringing the gripper inner surfaces onto a side surface of the inserted cable. The hinge pivot gripper mechanism now is in a "closed" position.

During a cable pulling operation, cable is being pulled rearward through the holding hinge pivot mechanism 210 by the cable pulling stroke. Rearward gripper movement initiates hinge pivot shank 218 movement away from the closed, "horizontal" position in contact with pivot limiters 242, pulling gripper members 223 apart and opening axial channel 225 as hinge pivots 214 rotate about pivot heads 216 in sockets 224. Opening axial channel 225 moves the gripper members off cable 213, allowing the cable to be pulled through holding gripper mechanism 210 unimpeded. Concurrently, rearward longitudinal movement of gripper members 223 pulls couple fork legs 248 rearward, via coupler connection joint 245, moving the spring-loaded fork lever 262 forward through tensioning hinge 249, incorporating torsional force in the hinge through the movement.

During the cable pulling recovery stroke there is no pulling force on cable 213. In the absence of a pulling force the tendency of spring-loaded fork 244 and lever 262 is to revert to vertical, e.g., through release of the built-up torsional force, pulling fork legs 248 forward and, with them, gripper members 223. Forward movement of the gripper members allows rotation of hinge pivots back to their maximal allowable horizontal position, laterally moving gripper members 223 together and back onto the cable, in the closed position. In the closed position, gripper inner surfaces can bite into and hold the cable side surface, thereby preventing backward movement of the cable during a recovery stroke. Upon completion of a cable pulling operation, hinge pivot mechanism 210 can again be placed in a locked, open position and inserted cable 213 removed from the opened axial channel.

Embodiments of this disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes that come within the meaning and range of equivalency of the claims are therefore intended to be embraced therein. While illustrative embodiments have been illustrated and described, it will be appreciated that various changes can be made therein without departing from the spirit and scope of the disclosure.

The invention claimed is:

1. A compact, integrated, mechanical device for gripping and releasing a cable, the device comprising:
   a plurality of at least two pivot hinges, each pivot hinge comprising a shaft terminating in a first and second opposing pivot hinge terminal head;
   a cable gripper comprising two opposing cable gripper members, each member having an outer surface comprising a recess dimensioned to receive and allow rotation of said first pivot hinge terminal head in said griper member outer surface recess, and a concave inner cable gripping surface. said cable gripping surfaces together defining an axial channel for receiving and engaging a cable:
   a pair of fixable parallel, opposing hinge base components flanking said cable gripper, each said hinge base component comprising a recess dimensioned to receive and allow rotation of said second pivot hinge terminal head in said hinge base component recess:
   such that, when said hinge base components are fixed, said first pivot hinge terminal heads are engaged in said recesses on said cable gripper member outer surfaces, said second pivot hinge terminal heads are engaged in said recesses on said parallel, opposing hinge base components, and force is applied in an axial direction to a cable engaged in said axial channel, each said pivot hinge terminal head rotates in each said recess to move said shaft and therethrough said gripper members to modulate the diameter of said axial channel.

2. The device of claim 1 wherein said hinge base components are fixed to inner side walls of a housing.

3. The device of claim 1 wherein said hinge base components comprise part of the inner side walls of a housing.

4. The device of claim 1 further comprising mechanical means for limiting the movement of said gripper members in at least one direction.

5. The device claim 1 further comprising mechanical means for limiting the minimum diameter of said gripper axial channel.

6. The device of claim 1 further comprising linking means for coupling said cable gripper members.

7. The device of claim 6 wherein said linking means comprises a yoke having two opposing terminal free ends, each terminal free end competent to engage a cable gripper member.

8. The device of claim 7 wherein each said yoke terminal free end engages said cable gripper member through a ball and socket joint 4.

9. The device of claim 7 wherein each said yoke terminal terminal free end engages said cable gripper member through a joint allowing at least two degrees of rotational freedom.

10. The device of claim 6 wherein said linking means further comprises a handle for manual manipulation of said axial channel diameter.

11. The device of claim 6 wherein said linking means further comprises a locking mechanism for holding said axial channel at a selected diameter.

12. The device of claim 1 further comprising a tensioning mechanism for modulating the speed of said axial channel diameter modulation.

13. The device of claim 1 wherein said pivot hinges further comprise an axial channel for receiving and delivering a lubricating fluid to said recesses.

14. The device of claim 1 comprising a plurality of at least four pivot hinges, each gripper member outer surface comprising two recesses dimensioned to receive and allow rotation of said first pivot hinge terminal heads in said gripper member outer surface recesses, and each hinge base component comprising two recesses dimensioned to receive and allow rotation of said second pivot hinge terminal heads in said hinge base component recesses.

15. A compact, integrated, mechanical device for gripping and releasing a cable, the device comprising:
   a plurality of at least four pivot hinges, each pivot hinge comprising a shaft terminating in a first and second opposing pivot hinge terminal head;
   a cable gripper comprising two opposing cable gripper members, each member having an outer surface comprising two recesses dimensioned to receive and allow rotation of said first pivot hinge terminal head in said griper member outer surface recess, and a concave inner cable gripping surface, said cable gripping surfaces together defining an axial channel for receiving and engaging a cable, and
   a pair of fixable parallel, opposing hinge base components flanking said cable gripper, each said hinge base component comprising two recesses dimensioned to receive and allow rotation of said second pivot hinge terminal head in said hinge base component recess;
   such that, when said hinge base components are fixed, said first pivot hinge terminal heads are engaged in said recesses on said cable gripper member outer surfaces, said second pivot hinge terminal heads are engaged in said recesses on said parallel, opposing hinge base components, and axial force is applied to a cable engaged in said axial channel, each said pivot hinge terminal head rotates in each said recess to move said shaft and therethrough said gripper members to modulate the diameter of said axial channel.

16. The device of claim 15 further comprising a mechanical stop operationally associated with said pivot hinge shaft or said gripper member and competent to limit the minimum diameter of said axial channel.

17. The device of claim 15 further comprising linking means for coupling said cable gripper members.

18. The device of claim 17 wherein said linking means comprises a yoke having two opposing terminal free ends, each terminal free end competent to engage a cable gripper member.

19. The device of claim 17 wherein said linking means further comprises a locking mechanism for holding said axial channel at a selected diameter.

20. The device of claim 15 further comprising a tensioning mechanism for modulating the speed of said axial channel diameter modulation.

* * * * *